(12) United States Patent
Cygler, III et al.

(10) Patent No.: US 9,182,058 B2
(45) Date of Patent: Nov. 10, 2015

(54) FITTING HAVING RECEPTACLE OF VARYING DEPTH

(75) Inventors: Frank J. Cygler, III, Nazareth, PA (US); Philip W. Bancroft, Belvidere, NJ (US); Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 885 days.

(21) Appl. No.: 13/368,589

(22) Filed: Feb. 8, 2012

(65) Prior Publication Data

US 2013/0200610 A1  Aug. 8, 2013

(51) Int. Cl.
*F16L 17/04* (2006.01)
*F16L 43/00* (2006.01)
*F16L 41/02* (2006.01)

(52) U.S. Cl.
CPC ............... *F16L 17/04* (2013.01); *F16L 41/021* (2013.01); *F16L 43/00* (2013.01)

(58) Field of Classification Search
CPC .......... F16L 17/04; F16L 41/007; F16L 43/00
See application file for complete search history.

(56) References Cited

U.S. PATENT DOCUMENTS

| | | | |
|---|---|---|---|
| 1,020,123 A | 3/1912 | Brampton et al. | |
| 1,203,989 A | 11/1916 | Dehn | |
| 1,287,108 A | 12/1918 | Robinson et al. | |
| 1,379,811 A | 5/1921 | Fyffe | |
| 1,770,271 A | 7/1930 | Hoppes | |
| 1,831,641 A | 11/1931 | Skinner | |
| 1,999,045 A | 4/1935 | Goetz | |
| 1,969,043 A | 8/1937 | Sharp | |
| 2,094,258 A | 9/1937 | Thompson | |
| 2,128,720 A | 8/1938 | Tweedale | |
| 2,412,394 A | 12/1946 | Giles | |
| 2,463,235 A | 3/1949 | Andrews | |
| 2,958,546 A | 11/1960 | Lee | |
| 3,054,629 A * | 9/1962 | Piatek | 285/373 |
| 3,148,896 A | 9/1964 | Chu | |
| 3,153,550 A | 10/1964 | Hollett | |
| 3,362,730 A | 1/1968 | Clair et al. | |
| 3,466,069 A | 9/1969 | Hoke et al. | |
| 3,517,701 A | 6/1970 | Smith | |
| 3,596,935 A | 8/1971 | McGeoch, Sr. | |
| 3,633,943 A | 1/1972 | Ramm et al. | |
| 3,680,894 A | 8/1972 | Young | |

(Continued)

FOREIGN PATENT DOCUMENTS

EP  2113701 A1  11/2009
GB  2098297  11/1982

(Continued)

OTHER PUBLICATIONS

Copenheaver, Blaine, PCT International Search Report from corresponding International Patent Application No. PCT/US2012/065793; Apr. 23, 2013, pp. 1-4, United States Patent Office as International Searching Authority.

(Continued)

*Primary Examiner* — James Hewitt
(74) *Attorney, Agent, or Firm* — Ballard Spahr LLP

(57) ABSTRACT

Elbow and tee fittings for joining pipe elements together include housing portions held preassembled in spaced apart relation to permit pipe elements to be inserted without disassembly of the fitting, the fittings having a receptacle of varying depth for receiving a sealing element.

35 Claims, 14 Drawing Sheets

(56) References Cited

U.S. PATENT DOCUMENTS

| | | |
|---|---|---|
| 3,825,286 A | 7/1974 | Henry, III |
| 3,920,270 A | 11/1975 | Babb, Jr. |
| 3,944,260 A | 3/1976 | Petroczky |
| 4,018,979 A | 4/1977 | Young |
| 4,284,298 A | 8/1981 | Kaufmann, Jr. |
| 4,461,498 A | 7/1984 | Kunsman |
| 4,471,979 A | 9/1984 | Gibb et al. |
| 4,611,839 A | 9/1986 | Rung et al. |
| 4,629,217 A | 12/1986 | Straub |
| 4,633,913 A | 1/1987 | Carty et al. |
| 4,639,020 A | 1/1987 | Rung et al. |
| 4,652,023 A | 3/1987 | Timmons |
| 4,664,422 A | 5/1987 | Straub |
| 4,678,208 A | 7/1987 | De Raymond |
| 4,792,160 A | 12/1988 | Hwang |
| 4,819,974 A | 4/1989 | Zeidler |
| 4,838,584 A | 6/1989 | Dierksmeier |
| 4,842,306 A | 6/1989 | Zeidler et al. |
| 4,861,075 A | 8/1989 | Pepi et al. |
| 4,893,843 A | 1/1990 | De Raymond |
| 4,896,902 A | 1/1990 | Weston |
| 5,018,768 A | 5/1991 | Palatchy |
| 5,022,685 A | 6/1991 | Stiskin et al. |
| 5,121,946 A | 6/1992 | Jardine |
| 5,137,305 A | 8/1992 | Straub |
| 5,161,836 A | 11/1992 | McKinnon |
| 5,230,537 A | 7/1993 | Newman |
| 5,280,970 A | 1/1994 | Straub |
| 5,354,108 A * | 10/1994 | Sandor .......................... 285/414 |
| 5,452,922 A | 9/1995 | Ziu |
| 5,603,530 A | 2/1997 | Guest |
| 5,675,873 A | 10/1997 | Groess |
| 5,758,907 A | 6/1998 | Dole et al. |
| 5,772,257 A | 6/1998 | Webb et al. |
| 5,786,054 A | 7/1998 | Platusich et al. |
| 5,961,154 A | 10/1999 | Williams et al. |
| 6,276,726 B1 | 8/2001 | Daspit |
| 6,305,719 B1 | 10/2001 | Smith, Jr. et al. |
| 6,450,551 B1 | 9/2002 | Lee |
| 6,505,865 B2 | 1/2003 | Minemyer |
| 6,626,466 B1 | 9/2003 | Dole |
| 6,749,232 B2 | 6/2004 | Wachter et al. |
| 7,070,209 B2 | 7/2006 | Collins |
| 7,090,259 B2 | 8/2006 | Dole |
| 7,644,960 B2 | 1/2010 | Casey, Sr. et al. |
| 7,654,587 B2 | 2/2010 | Gibb et al. |
| 7,712,796 B2 | 5/2010 | Gibb et al. |
| 7,726,703 B2 * | 6/2010 | Porter et al. .................. 285/420 |
| 7,789,434 B2 | 9/2010 | Nagle et al. |
| 7,798,535 B2 | 9/2010 | Calhoun |
| 7,861,982 B1 | 1/2011 | McClure |
| 7,891,713 B2 | 2/2011 | Bekkevold |
| 2005/0001428 A1 | 1/2005 | Scherrer |
| 2005/0028366 A1 | 2/2005 | Bien et al. |
| 2006/0214422 A1 | 9/2006 | Cuvo et al. |
| 2008/0265568 A1 | 10/2008 | Bekkevold |
| 2008/0272595 A1 | 11/2008 | Gibb et al. |
| 2009/0160183 A1 | 6/2009 | Felber |
| 2009/0172939 A1 | 7/2009 | Dole |
| 2009/0206598 A1 | 8/2009 | Gibb et al. |
| 2010/0148493 A1 * | 6/2010 | Madara et al. .................. 285/24 |
| 2010/0320756 A1 | 12/2010 | Gibb et al. |
| 2011/0154646 A1 | 6/2011 | Hagiya |
| 2012/0074689 A1 | 3/2012 | Petersen et al. |
| 2013/0127160 A1 * | 5/2013 | Bancroft et al. ............... 285/349 |
| 2013/0327415 A1 | 12/2013 | Camp, Jr. et al. |

FOREIGN PATENT DOCUMENTS

| | | |
|---|---|---|
| GB | 2211255 A | 6/1989 |
| KR | 100315861 | 11/2001 |
| KR | 1020090007813 | 1/2009 |
| KR | 100904419 | 6/2009 |
| KR | 1020090066767 | 6/2009 |
| WO | 9703811 | 2/1997 |

OTHER PUBLICATIONS

Copenheaver, Blaine, PCT Written Opinion of the International Searching Authority from corresponding International Patent Application No. PCT/US2012/065793; Apr. 23, 2013, pp. 1-5, United States Patent Office as International Searching Authority.

(Copenheaver, Blaine R.) PCT International Search Report and Written Opinion regarding International Application No. PCT/US2012/062148; dated Mar. 19, 2013.

No Author, Coupling; Dudeco, JJ Coupling Product Catalog, Date Unknown; pp. 1-16, Korea.

Chionchio, John A.; Fitting for Joining Pipe Elements; U.S. Appl. No. 13/364,412, filed Feb. 2, 2012; Specification, Claims and Drawings; pp. 1-54.

Chionchio, John A.; Coupling Having Gasket Pocket of Varying Depth; U.S. Appl. No. 13/300,861, filed Nov. 21, 2011; Specification, Claims and Drawings (Replacement Pages); pp. 1-45.

* cited by examiner

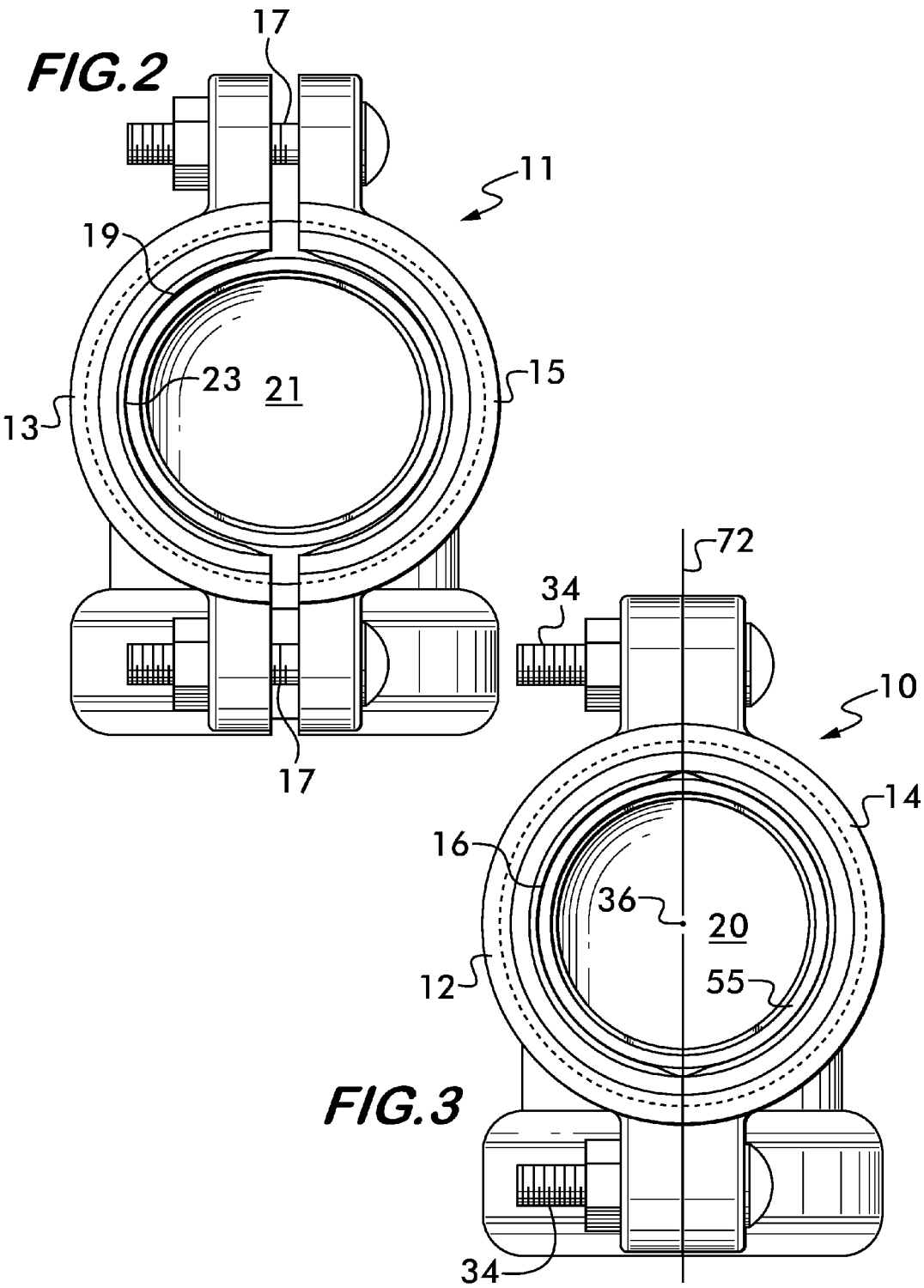

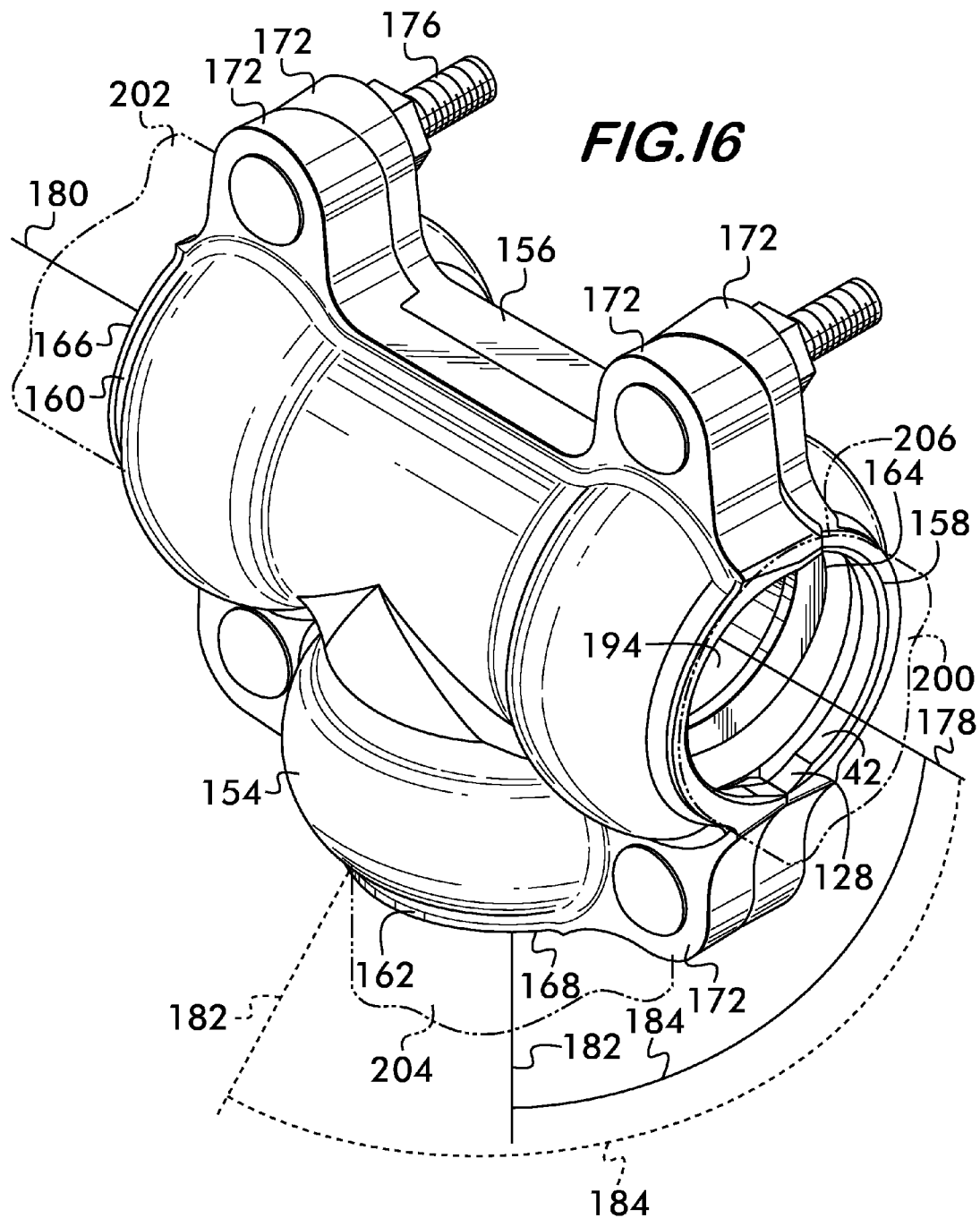

FITTING HAVING RECEPTACLE OF VARYING DEPTH

FIELD OF THE INVENTION

This invention relates to fittings, such as elbow fittings and "tee" fittings used to join pipe elements together.

BACKGROUND

Fittings, such as elbows and tees, for joining pipe elements together end-to-end, comprise interconnectable housing portions that are positionable circumferentially surrounding the end portions of pipe elements. The term "pipe element" is used herein to describe any pipe-like item or component having a pipe-like form. Pipe elements include pipe stock as well as fluid control components such as valves, strainers, restrictors, pressure regulators and the like.

An exploded view of an exemplary fitting is provided in FIG. 1. Each housing portion of the fitting has projections, also called "keys", which extend radially inwardly and engage, for example, the outer surfaces of plain end pipe elements, pipe elements having a shoulder and bead, or circumferential grooves that extend around each of the pipe elements to be joined. Engagement between the keys and the pipe elements provides mechanical restraint to the connection and ensures that the pipe elements remain coupled even under high internal pressure and thrust loads and external forces. The housing portions define an annular channel or pocket, for example, a receptacle, that receives a seal, for example a ring gasket, typically an elastomeric ring which engages the ends of each pipe element and cooperates with the housing portions and the pipe elements to provide a fluid tight seal. A tube within the fitting extends between the ring gaskets to ensure that the entire fitting remains fluid tight. The housing portions have connection members, typically in the form of lugs which project outwardly from the housings. The lugs are adapted to receive adjustable fasteners, such as nuts and bolts, which are adjustably tightenable to draw the housing portions toward one another.

The projections on prior art fittings typically have arcuate surfaces with a radius of curvature that is substantially matched to the radius of curvature of the outer surface of the pipe element that it is intended to engage. For fittings used with grooved pipe elements, the radii of curvature of the arcuate surfaces are smaller than the radii of curvature of the outer surfaces of the pipe elements outside of the grooves so that the projections fit within and engage the grooves.

Methods of securing pipe elements together comprise a sequential installation process when fittings according to the prior art are used. Typically, the fitting is received by the technician with the housing portions bolted together, the ring gaskets and tube comprising the sealing element being captured between the housing portions of the fittings. The technician first disassembles the fitting by unbolting it, removes the ring gaskets, lubricates them (if not pre-lubricated) and places them around the ends of the pipe elements to be joined. Installation of the ring gaskets often requires that they be lubricated and stretched to accommodate the pipe elements. With the ring gaskets in place on the pipe elements, the tube is engaged with the ring gasket on each pipe element. The housing portions are then placed one at a time around the ring gaskets and tube, straddling the ends of the pipe elements. During placement, the housing portions engage the ring gaskets, the keys are aligned with the grooves in the pipe elements (when present), the bolts are inserted through the lugs, the nuts are threaded onto the bolts and tightened, drawing the housing portions toward one another, compressing the ring gaskets to effect a seal between the pipe elements, the tube and the fitting. The keys are engaged within the grooves in the pipe elements to provide mechanical constraint.

FIG. 2 shows a fitting 11 having first and second housing portions 13 and 15. The housing portions 13 and 15 are attached to one another by fasteners 17 and define a first receptacle 19 and a second receptacle (not shown). The first receptacle 19 defines an opening 21 for receiving a pipe element. The housing portions 13 and 15 are supported in spaced relation from one another on the outer surface of the seal 23 captured between the housing portions. This configuration is possible because the circumference of the outer surface of an undeformed seal 23 is greater than the sum of the circumferences of the surfaces on the housing portions with which the seal outer surface interfaces. When the housing portions are supported in this manner it is possible to insert pipe elements into the opening 21 between the housing portions without disassembling the fitting. However, there are some drawbacks to this solution to the problem of installing mechanical fittings. Note in particular that the seal 23 is distorted into an oval shape by the geometry of a close-fitting housing portion riding on at least a portion of the seal before the seal has properly seated in the pocket of the housing portion. If the degree of distortion of the seal is uncontrolled, the oval shape can result in pinching and damage to the seal.

As evident from the previous description, installation of fittings according to the prior art requires that the technician typically handle as many as thirteen individual piece parts, and must totally disassemble and reassemble the fitting. Significant time, effort and expense would be saved if the technician could install a fitting without first totally disassembling it and then reassembling it, piece by piece. Additionally, there is clearly a need for a pipe fitting with which the distortion of the ring seal may be controlled so as to avoid damage to the ring seal with which it is used, yet will also allow pipe elements to be inserted reliably without disassembly of the fitting.

SUMMARY

The invention concerns a fitting for connecting at least two pipe elements together. In one example embodiment, the fitting comprises first and second housing portions attached to one another and defining at least first and second receptacles. The first and second receptacles respectively define first and second openings for receiving the pipe elements. The housing portions further define a fluid path extending between the first and second receptacles. At least one adjustable fastener attaches the first and second housing portions to one another. The housing portions are supported in spaced apart relation sufficient to permit the pipe elements to be inserted into the receptacles while the housing portions are attached to one another. The fasteners are adjustably tightenable so as to draw the housing portions toward one another and bring the receptacles into engagement with the pipe elements so as to affix the pipe elements together.

The first receptacle need not be coaxially aligned with the second receptacle. In such an embodiment, the first receptacle surrounds a first axis oriented coaxially with the first opening and the second receptacle surrounds a second axis oriented coaxially with the second opening, the first and second axes being angularly oriented with respect to one another. The first and second axes may have an orientation angle from about 90° to about 174° with respect to one another.

Each housing portion comprises a first arcuate surface extending circumferentially about the first opening. At least a portion of each first arcuate surface is engageable with a respective one of the pipe elements. The first arcuate surface faces the first axis. The first arcuate surface has a first radius of curvature measured from a first center of curvature. A first back wall is positioned adjacent to the first arcuate surface. The first back wall has an arcuate surface facing the first axis. The arcuate surface of the first back wall has a second radius of curvature measured from a second center of curvature. The second center of curvature is non-coincident with the first center of curvature as measured in a plane perpendicular to the first axis.

In one embodiment, the first center of curvature is closer to the arcuate surface of the first back wall than the second center of curvature when measured to a point on the arcuate surface of the first back wall that is collinear with the first and second centers of curvature. In another embodiment, the first and second centers of curvature and the point on the first back wall are collinear along a first line oriented perpendicular to a second line extending between a first end of the housing portion and a second end of the housing portion.

The second center of curvature may be offset from the first center of curvature at a distance from about 0.01 inches to about 0.1 inches, or at a distance of about 0.02 inches to about 0.04 inches, or at a distance of about 0.03 inches.

The fitting may further comprise a first seal positioned within the first receptacle. The first seal surrounds the first opening. A second seal is positioned within the second receptacle and surrounds the second opening. A tube extends within the fitting between the first and second seals. The tube may be integrally formed with the first and second seals, or the seals may sealingly engage the tube when they are compressed between the first and second housing portions. The seals support the first and second housing portions in spaced apart relation sufficient to insert the pipe elements between the housing portions and may have a shape which is distorted into an oval, or which is substantially undistorted and presents a round shape. The degree of distortion of the seals is determined by the offset of the first and second centers of curvature. The first seal has an outer circumference having a length greater than the sum of the lengths of the arcuate surfaces of the first back walls of the housing portions.

In another example embodiment of a fitting for joining pipe elements together according to the invention, the distance between the arcuate surface of the first back wall and the first arcuate surface, as measured along a radially projecting line extending from the first axis, is a first value at a first point midway between the ends of the housing portion, and a second value at a second point proximate to at least one of the ends of the housing portion. The first value is less than the second value.

The distance between the arcuate surface of the first back wall and the first arcuate surface may be a minimum at the first point midway between the ends of the housing portion, and a maximum at the second point. The second point may be positioned at the at least one end of the housing portion. The distance between the arcuate surface of the first back wall and the first arcuate surface at a third point positioned at another of the ends of the housing portion may be a third value approximately equal to the second value.

In a particular example embodiment, the arcuate surface of the first back wall comprises a first portion having a curved surface, and a second portion having a curved surface. The second portion is positioned proximate to the at least one end of the housing portion. Any point on the second portion is farther from said first axis than any point on said first portion. The arcuate surface of the first back wall may further comprise a third portion having a curved surface. The third portion is positioned proximate to another of the ends of the housing portion. Any point on the third portion is farther from the first axis that any point on the first portion.

The second portion of the arcuate surface of the first back wall may subtend an angle from about 5° to about 80°, or from about 5° to about 45°. The third portion of the arcuate surface of the first back wall may subtend an angle from about 5° to about 80°, or from about 5° to about 45°.

In another example embodiment of a fitting according to the invention, the arcuate surface of the first back wall comprises a first portion having a first radius of curvature, and a second portion having an infinite radius of curvature. The second portion is positioned proximate to the at least one end of the housing portion. Any point on the second portion is farther from the first axis than any point on the first portion. The arcuate surface of the first back wall may further comprise a third portion having an infinite radius of curvature. Any point on the third portion is farther from the first axis than any point on the first portion. The third portion is positioned proximate to another of the ends of the housing portion. The second portion of the arcuate surface of the first back wall may subtend an angle from about 5° to about 45°, or from about 5° to about 30°. The third portion of the arcuate surface of the first back wall may subtend an angle from about 5° to about 45°, or from about 5° to about 30°. In another example embodiment, the arcuate surface of the first back wall may further comprise a plurality of the second portions of the arcuate surface of the first back wall, each of the second portions having infinite radii of curvature. Additionally, the arcuate surface of the first back wall may further comprise a plurality of the third portions of the arcuate surface of the first back wall, each having an infinite radius of curvature. The third portions of the arcuate surfaces of the first back wall are positioned proximate to another of the ends of the housing portion. The plurality of second portions of the arcuate surface of the first back wall may subtend an angle from about 5° to about 80°, or from about 5° to about 30°. The plurality of third portions of the arcuate surface of the first back wall may subtend an angle from about 5° to about 80°, or from about 5° to about 30°.

In another embodiment, the first and second housing portions may further define a third receptacle. In this embodiment the third receptacle defines a third opening for receiving one of the pipe elements. The housing portions further define the fluid path to extend between the first, second and third receptacles. In an example embodiment of a fitting having a third receptacle, the first receptacle may surround a first axis oriented coaxially with the first opening, the second receptacle may surround a second axis oriented coaxially with the second opening, and the third receptacle may surround a third axis oriented coaxially with the third opening. The first and second axes may be co-linear with one another, the third axis may be angularly oriented with respect to the first and second axes. The first and third axes may have an orientation angle from about 30° to about 150° with respect to one another.

An example fitting embodiment may further comprise at least one lug extending from each of the first and second housing portions. Each of the lugs defines a hole for receiving one of the fasteners.

An example fitting embodiment has a first seal positioned within the first receptacle and surrounding the first opening. A second seal is positioned within the second receptacle and surrounds the second opening. A third seal is positioned within the third receptacle and surrounds the third opening. A tube extends within the fitting between the first, second and third seals. The tube may be integrally formed with the first, second and third seals.

In an alternate embodiment, the seals sealingly engage the tube when the seals are compressed between the first and second housing portions. The first and second housing portions may be supported in the spaced relation by contact with the first and second seals. To that end, the first and second seals may have an outer circumference sized to support the housing portions in spaced apart relation sufficient to permit the pipe elements to be inserted into the receptacles.

In another embodiment, the first and second housing portions may be supported in the spaced relation by contact with the first, second and third seals. The first, second and third seals may have an outer circumference sized to support the housing portions in the spaced apart relation sufficient to permit the pipe elements to be inserted into the receptacles.

BRIEF DESCRIPTION OF THE DRAWINGS

FIG. 2 is an elevational view of an example mechanical pipe fitting according to the invention;

FIG. 3 is an elevational view of an example mechanical pipe fitting according to the invention;

FIG. 16 is an isometric view of the fitting shown in FIG. 14 joining pipe elements together.

DETAILED DESCRIPTION

Figure 1:
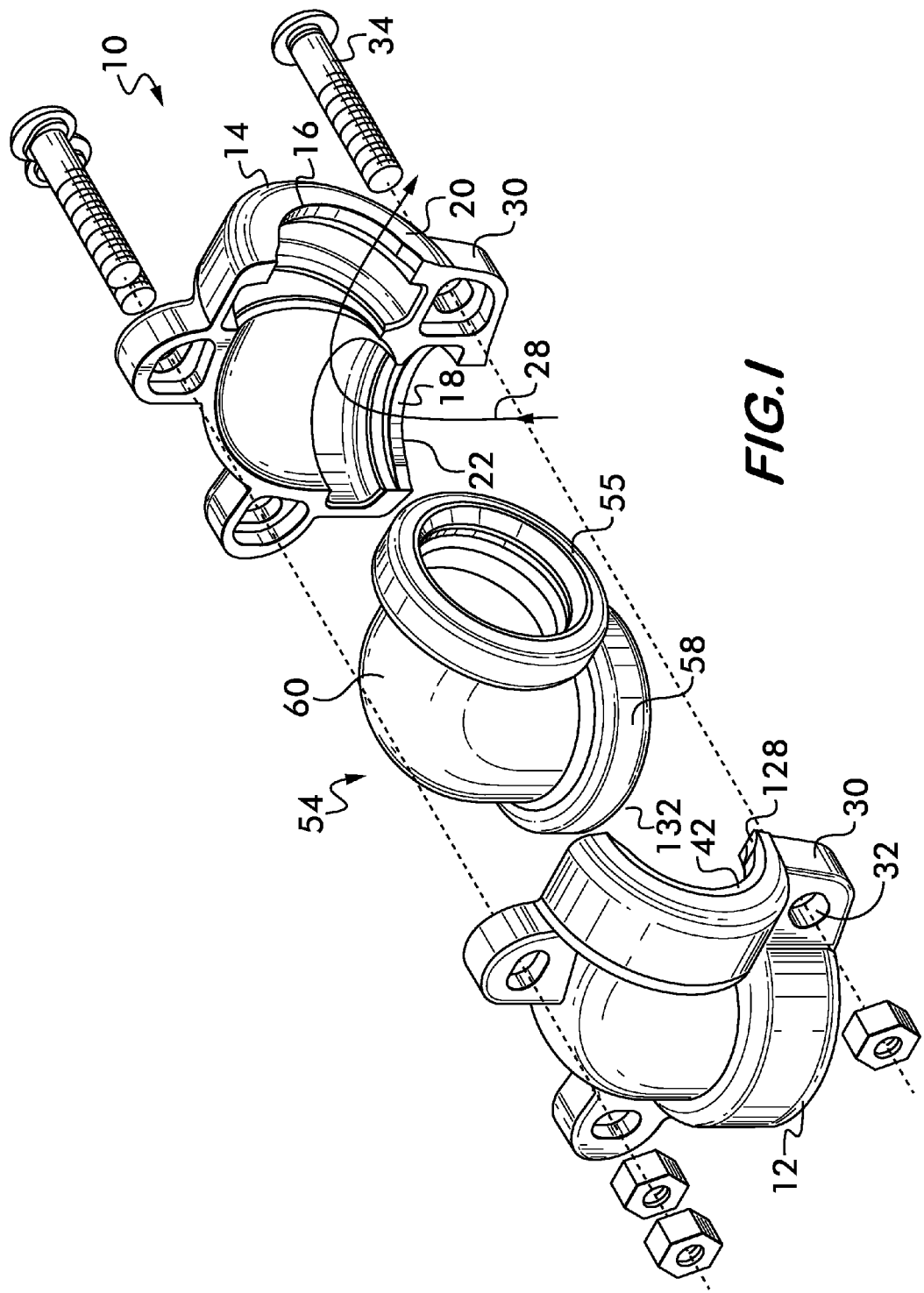
FIG. 1 is an exploded isometric view of an example elbow fitting according to the invention.
Figure 9:
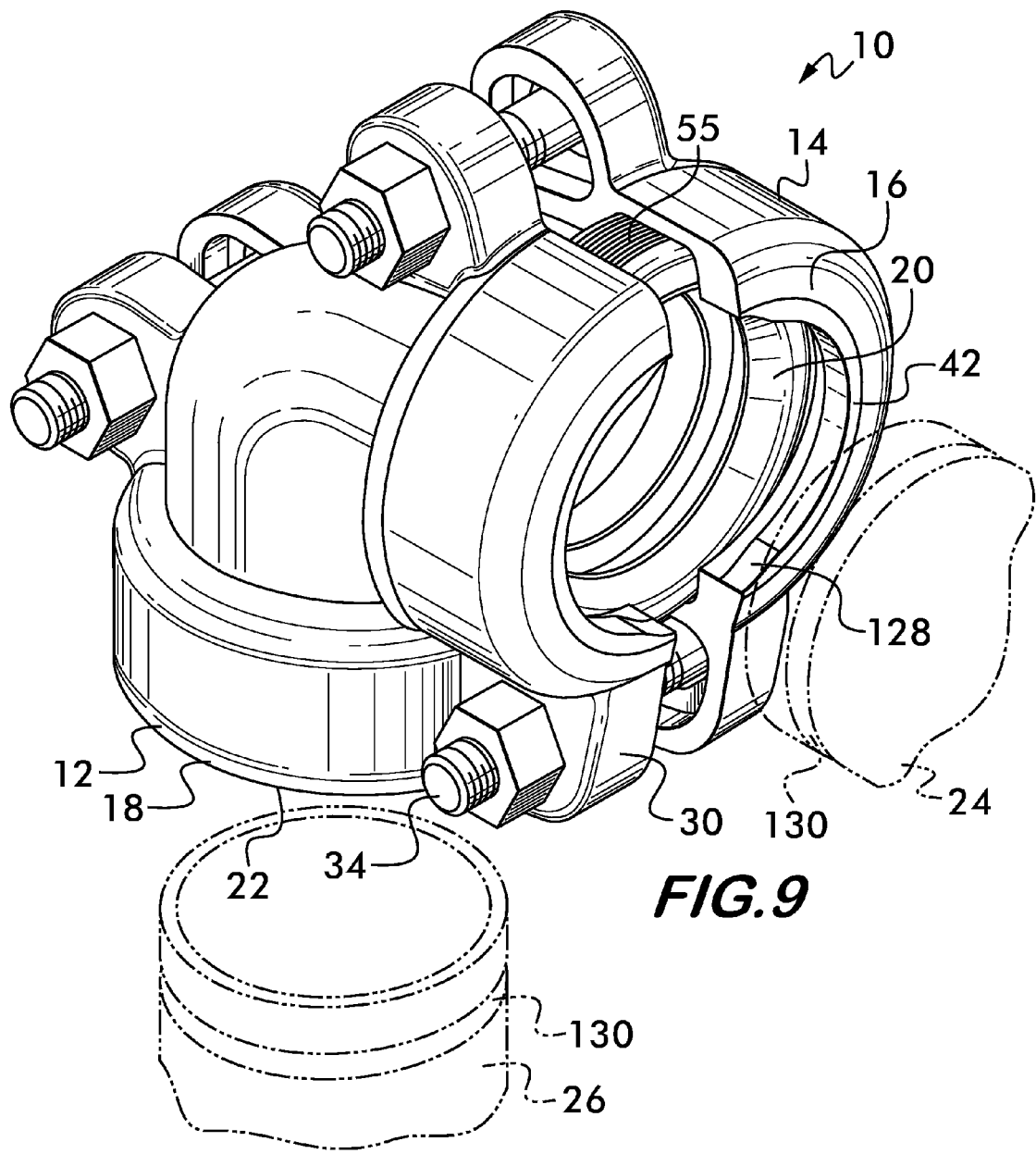
FIG. 9 is an isometric view of the elbow fitting shown in FIG. 1 preassembled in an installation ready configuration.

FIG. 3 shows an elevational view of an example fitting 10 according to the invention. FIG. 1 shows an exploded view of example fitting 10. Fitting 10 comprises first and second housing portions 12 and 14. When attached to one another, as shown in FIG. 9, the housing portions 12 and 14 define at least a first receptacle 16 and a second receptacle 18 located at opposite ends of the fitting to one another. Receptacles 16 and 18 define respective first and second openings 20 and 22 for receiving respective pipe elements 24 and 26, shown in phantom line. Housing portions 12 and 14 together also define a fluid path extending between the first and second receptacles 16 and 18, the fluid path being depicted by the arrow 28 shown in FIG. 1 for clarity.

Figure 10:
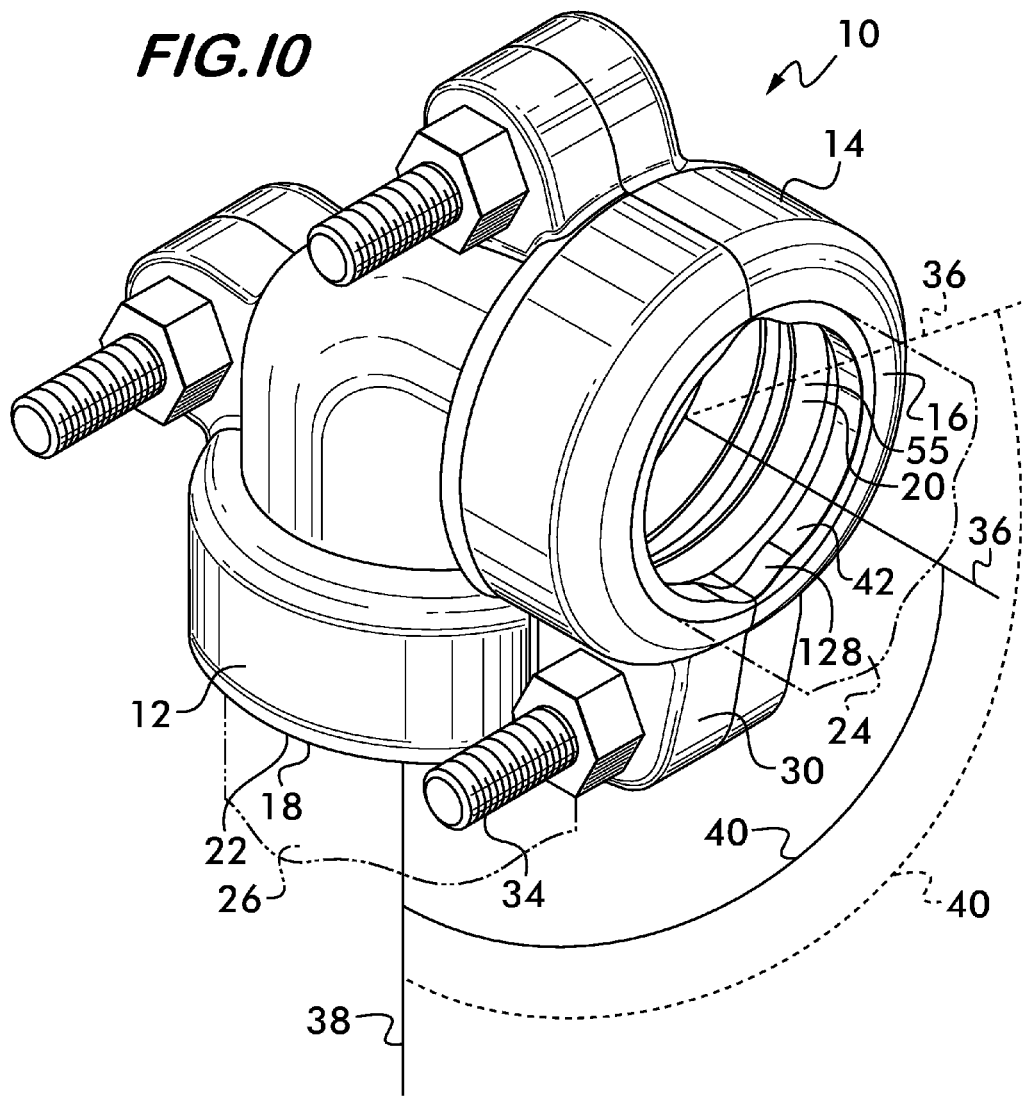
FIG. 10 is an isometric view of the elbow fitting shown in FIG. 1 joining pipe elements together.

A plurality of lugs 30 extend from each housing portion 12 and 14. In the example fitting of FIG. 1 each housing portion has three lugs. Lugs 30 define holes 32. When the housing portions 12 and 14 are assembled in facing relation as shown in FIG. 9, the holes 32 in lugs 30 align to receive fasteners 34 which attach the housing portions to one another to form the fitting 10. Fasteners 34 are adjustably tightenable so as to draw the first and second housing portions 12 and 14 toward one another and bring the first and second receptacles 16 and 18 into engagement with the pipe elements 24 and 26 (respectively) so as to affix the pipe elements together as shown in FIG. 10.

In the example fitting embodiment 10, the first receptacle 16 is not coaxially aligned with the second receptacle 18. As shown in FIGS. 3 and 10, the first receptacle 16 surrounds a first axis 36 oriented coaxially with the first opening 20 and the second receptacle 18 surrounds a second axis 38 oriented coaxially with the second opening 22. Axes 36 and 38 may be used to define the angular orientation of the receptacles 16 and 18 relatively to one another and thereby define the type of fitting. In fitting 10, the orientation angle 40 between axes 36 and 38 is about 90°, marking this fitting as a 90 degree elbow. For practical elbow designs the orientation angle 40 may range from about 90° to about 174° as shown in phantom line.

Figure 4:
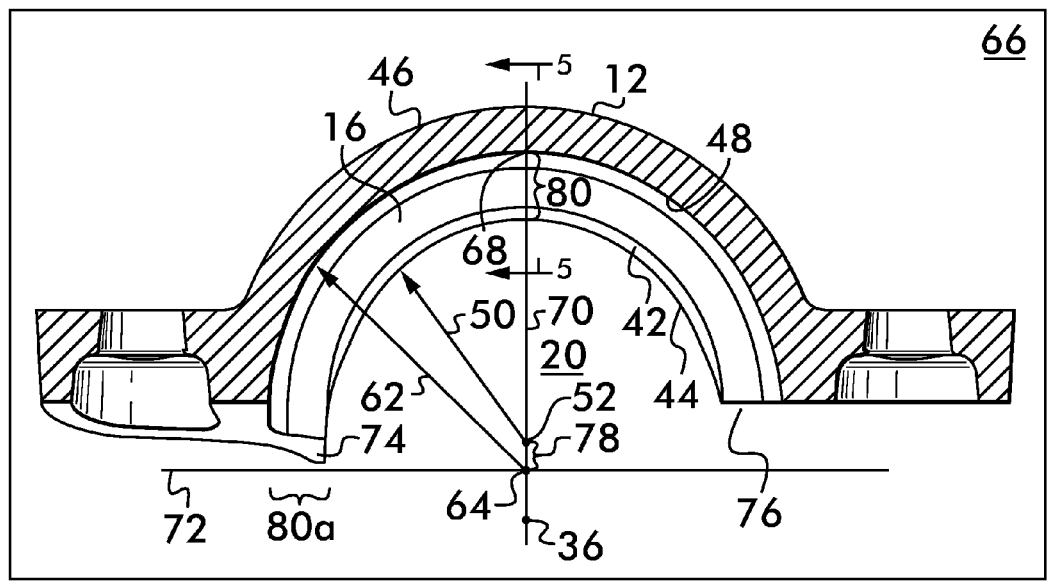
FIG. 4 is a cross sectional view of a housing portion of an example mechanical pipe fitting according to the invention.
Figure 5:
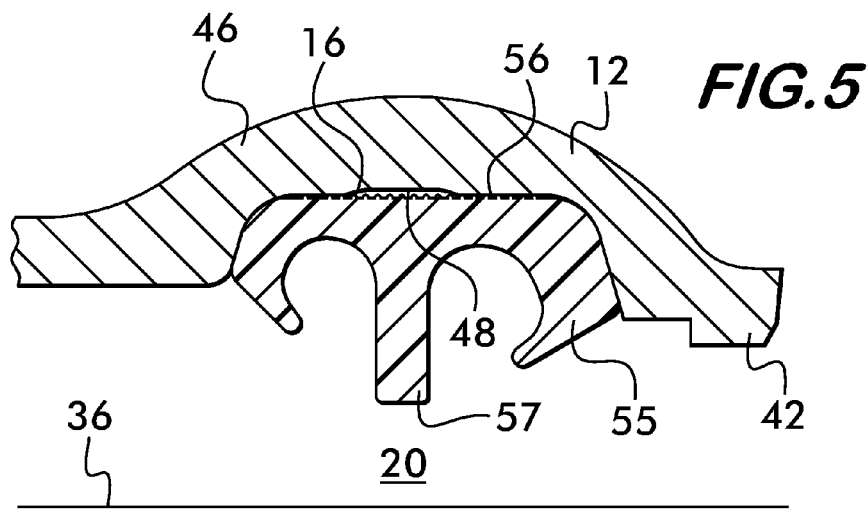
FIG. 5 is a cross sectional view of the housing portion of an example mechanical pipe fitting taken at line 5-5 of FIG. 4.

As shown in FIG. 5, each housing portion (housing portion 12 being shown) has a first projection 42 that extends circumferentially around the first opening 20. At least a portion of each first projection is engageable with a respective pipe element to provide mechanical engagement and hold the pipe elements together. The first projections 42 engage the outer surface of the pipe elements, which may be a plain surface, a surface forming a circumferential groove, or a surface having a raised shoulder, or a shoulder and bead for example. The first projections 42 may have one or more notches 128 (see FIGS. 1 and 9-10, for example) to facilitate insertion of the pipe elements into the first opening 20. As shown in FIGS. 4 and 5, each first projection 42 has an arcuate surface 44 facing first axis 36. The arcuate surface 44 of each projection has a radius of curvature 50 measured from a center of curvature 52 of the arcuate surface.

To establish and maintain fluid tightness of a connection between pipe elements formed by the fitting 10, a sealing element 54 is positioned between the housing portions 12 and 14. As shown in FIG. 1, sealing element 54 comprises a first seal 55 positioned within the first receptacle 16, a second seal 58 positioned within the second receptacle 18, and a tube 60 extending within the fitting 10 along the fluid path 28 between the first and second seals 55 and 58. In this example, the first and second seals 55 and 58 are integrally formed with the tube 60 in one piece. Sealing element 54 may be formed from elastomeric materials such as EPDM, as well as nitrile, silicone, neoprene and fluoropolymer elastomers.

Receptacle 16 receives the first seal 55 (FIGS. 5 and 9) positioned between the housing portions 12 and 14 (see FIG. 3) to ensure a fluid-tight seal. In this example fitting at least a portion of seal 54, for example, first seal 55 supports the housing portions 12 and 14 in spaced apart relation when assembled. The first back wall 46 is positioned adjacent to the first projection 42 and, as shown in FIGS. 4 and 5, has an arcuate surface 48 which faces the first axis 36. The first back wall's arcuate surface 48 has a radius of curvature 62 measured from a center of curvature 64 of the back wall arcuate surface. When viewed or measured in the plane 66 oriented perpendicular to the first axis 36 of the fitting 10, the center of curvature 52 of the arcuate surfaces 44 on the first projection 42 is non-coincident with the center of curvature 64 of the arcuate surface 48 of the first back wall 46. In the example shown in FIG. 4, the centers of curvature 52 are closer to the arcuate surface of the first back wall 46 than the center of curvature 64 of the first back wall's arcuate surface 48 when measured to a point 68 on the back wall's arcuate surface 48 that is collinear with the centers of curvature 52 and 64, as shown by line segment 70. As further shown in FIG. 4, the centers of curvature 52 and 64 and point 68 on the back wall arcuate surface 48 are collinear along line 70, which is oriented perpendicular to a second line 72 extending between the ends 74 and 76 of the first housing portion 12.

The offset distance 78 between the center of curvature 52 and the center of curvature 64 results in an eccentrically shaped receptacle 16 of varying depth wherein the arcuate surface 48 of the first back wall extends further outwardly from a true circle as one proceeds along the first back wall from the middle of the first projection 42 to either end 74 or 76 of the housing portion. If the depth 80 of the receptacle 16, measured from the first projection's arcuate surface 44 to the back wall's arcuate surface 48, is the value "h" at the middle of the first projection 42, then the depth 80a at either end 74, 76 of the first housing portion 12 is approximately "h" (80)+ offset distance 78. The depth 80 may be defined as the distance between the arcuate surface 44 of the first projection 42 and the arcuate surface 48 of the first back wall 46, measured along a radially projecting line extending from the first axis 36. In this example embodiment, this distance, depth 80, varies from a value of h at a point between the ends 74 and 76 of the first housing portion 12, and a greater value, h+offset, at points at each end of the housing portion. This increased depth, located at the ends of the housing portion, provides more outwardly radial room for the seal at the ends of the housing portion, which, due to the geometry of the first seal 55 and the receptacle 16, would normally contact the first seal and distort it out of round as shown in FIG. 2. However, because the receptacle 16 is eccentric, with its eccentricity of h+offset distance a maximum at the ends 74 and 76 of the housing portions 12 and 14 (and a minimum of "h" midway between the ends), contact between arcuate surface 48 of the first back wall 46 and the outer surface 56 of the first seal 55 can be controlled and thereby control the degree of distortion of the first seal out of round when the fitting 10 is factory assembled with the first and second housing portions 12 and 14 supported in spaced relation on the outer surface 56 of the first seal 55 so that pipe elements may be inserted into the first opening 20 without disassembling the fitting. It is possible to support first and second housing portions 12 and 14 in spaced relation because the circumference of the outer surface 56 of an undeformed seal 55 is greater than the sum of the circumferences of the arcuate surfaces 48 on the housing portions 12 and 14 with which the seal outer surface 56 interfaces. The degree of distortion of seal 55 may range from substantially no distortion, providing the round shape shown in FIG. 3, to an oval shape as shown for seal 23 in FIG. 2. As the offset distance 78 increases, the degree of ovality of the seal decreases. While it is possible to eliminate substantially all of the distortion of the seal, for practical designs it is sometimes advantageous to provide a controlled degree of distortion. Advantage is obtained when the degree of distortion is such that pinching of the seal is avoided while maintaining enough eccentricity such that the seal grips one of the pipe ends and holds it on the pipe element when it is inserted into the opening. This allows convenient assembly of the pipe connection as the technician does not need to hold the fitting and first pipe element together while he maneuvers the second pipe element into engagement with the fitting. Offset distances 78 of about 0.01 inches to about 0.1 inches are found practical for fittings suited for pipe elements having a nominal outer diameter of ten inches or less. The offset distance may further range from about 0.02 inches to about 0.04 inches, with an offset distance of about 0.03 inches being advantageous for some combinations of fittings and pipe elements.

Figure 6:
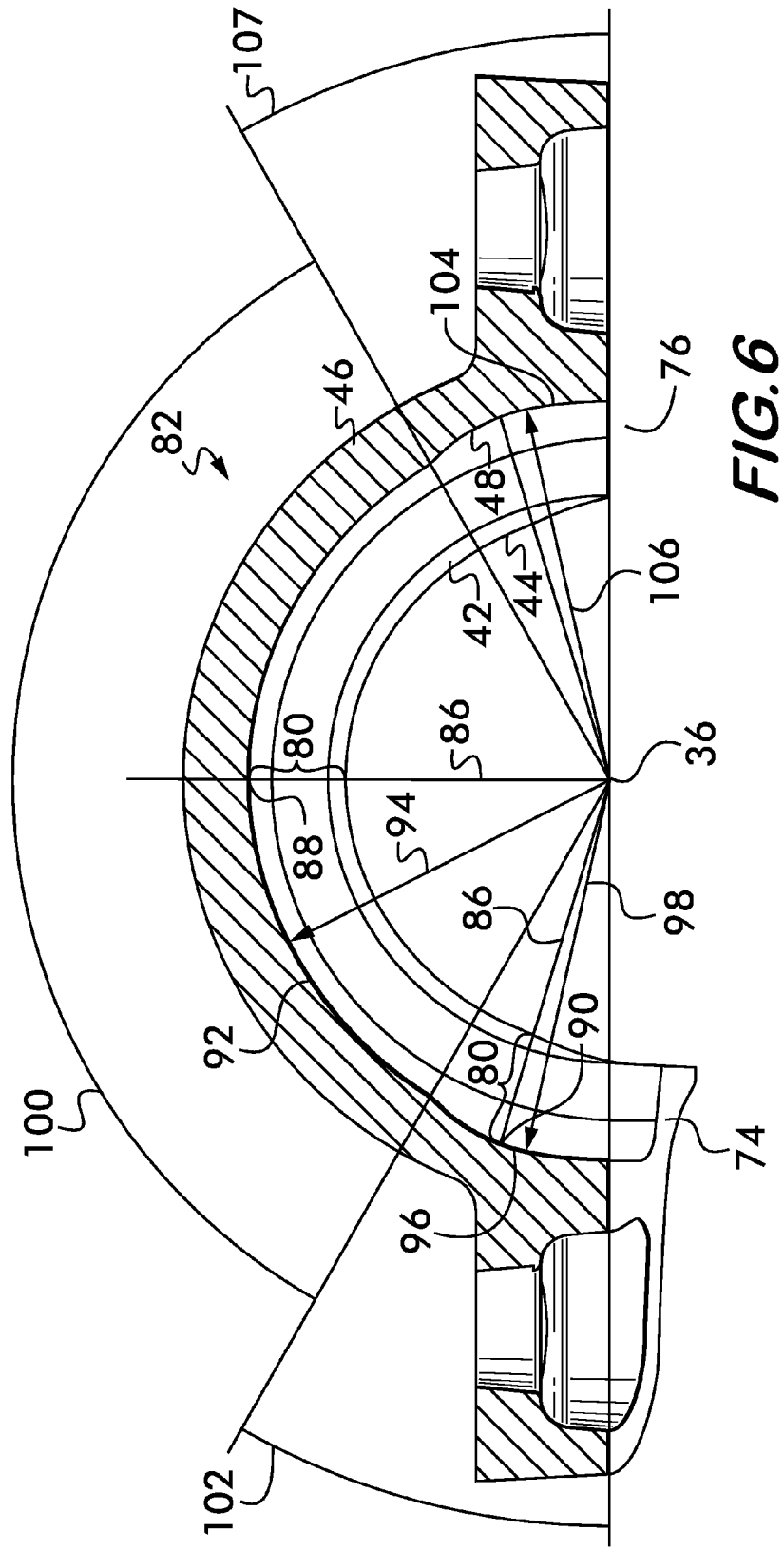
FIG. 6 is a cross sectional view of a housing portion of an example mechanical pipe fitting according to the invention.
Figure 7:
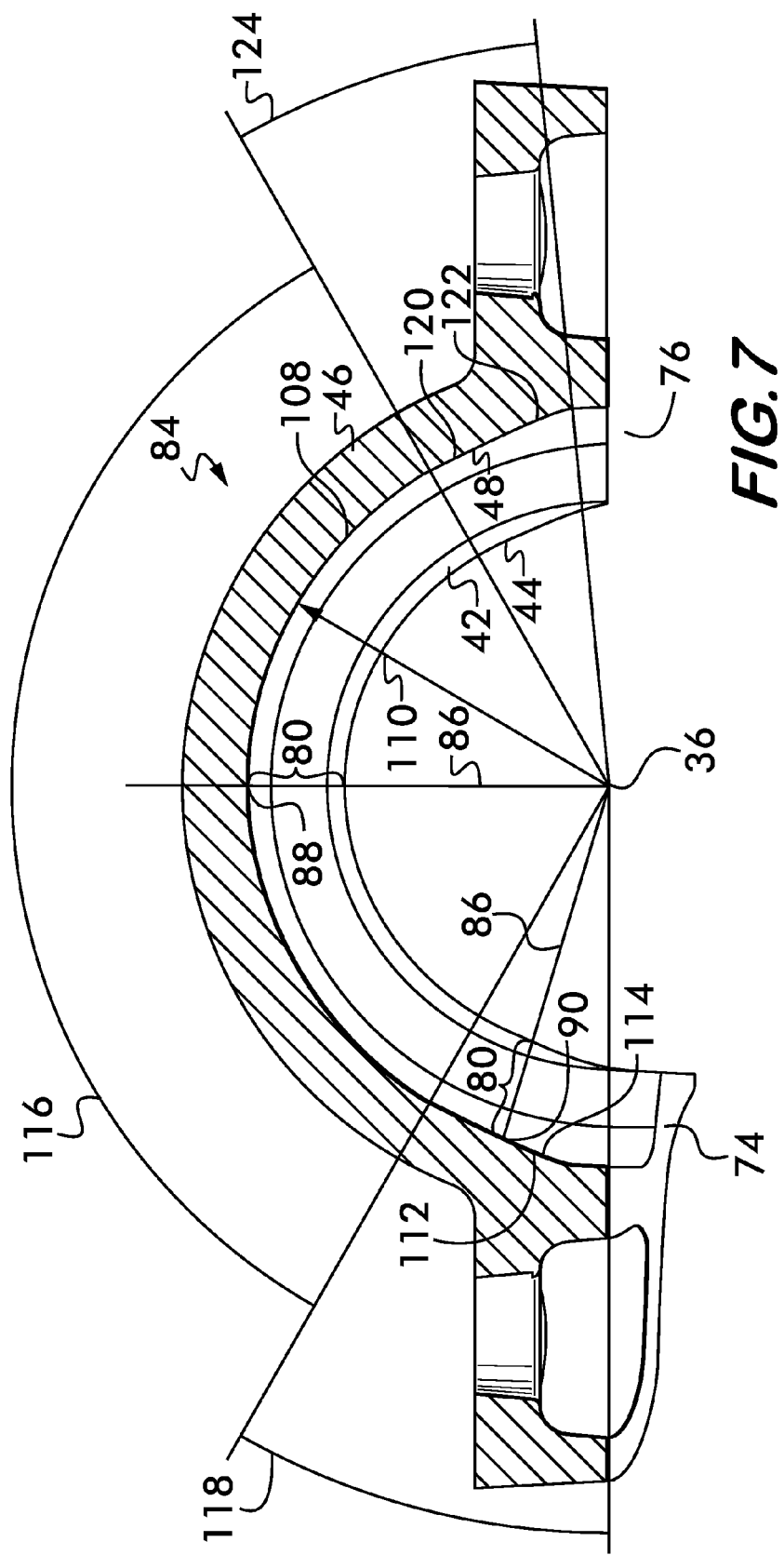
FIG. 7 is a cross sectional view of a housing portion of an example mechanical pipe fitting according to the invention.

FIGS. 6 and 7 illustrate respective housing portions 82 and 84 wherein the distance 80 between the arcuate surface 44 of the first projection 42 and the arcuate surface 48 of the first back wall 46, as measured along a radially projecting line 86 extending from the first axis 36 is smaller at a point 88 midway between the ends 74 and 76 of the housing portion than at a point 90 proximate to one of the ends of the housing portion.

For housing portion 82, shown in FIG. 6, the arcuate surface 48 of the first back wall 46 comprises a first surface portion 92 which has a first radius of curvature 94, and a second surface portion 96, positioned proximate to end 74 of the housing portion 82, which has a second radius of curvature 98. Any point on the second surface portion 96 is farther from the first axis 36 than any point on the first portion 92. Thus the distance 80 between the arcuate surface 44 of the first projection 42 and the arcuate surface 48 of the first back wall 46 is smaller over the angle 100 subtended by the first surface portion 92 than over the angle 102 subtended by the second surface portion 96. Second surface portion 96 may subtend an angle 102 from about 5° to about 80°. A subtended angle from about 5° to about 45° is also practical.

In this example the arcuate surface 48 further comprises a third surface portion 104 located at the opposite end 76 of the housing portion. Third surface portion 104 has a radius of curvature 106. (The respective radii of curvature 98 and 106 of the second surface portion 96 and the third surface portion 104 may be equal to one another.) Any point on the third surface portion 104 is farther from the first axis 36 than any point on the first portion 92. Thus the distance 80 between the arcuate surface 44 of the first projection 42 and the arcuate surface 48 of the first back wall 46 is smaller over the angle 100 subtended by the first surface portion 92 than over the angle 107 subtended by the third surface portion 104. Third surface portion 104 may subtend an angle 107 from about 5° to about 80°. A subtended angle from about 5° to about 45° is also practical.

Note that the distances 80 and differences between the radii of curvature are exaggerated for clarity. While the geometrical relationships between the arcuate surfaces 44 and 48 are described for one projection 42 on one housing portion, it is understood that each housing portion of a fitting may have such a projection surrounding each opening of the fitting and such a back wall positioned adjacent to each respective projection. It is further understood that the geometrical relation between the arcuate surfaces on each projection and the arcuate surface of each back wall may be the same. For example, it is contemplated that each housing portion may further comprise a second projection extending circumferentially about the second opening 22 (see FIGS. 1 and 9-13) of the fitting. In this example, at least a portion of the second projection is engageable with one of the pipe elements (26, as shown in FIGS. 10 and 13), and the second projection has an arcuate surface facing the second axis 38 (see FIG. 10). Each housing portion may further comprise a second back wall positioned adjacent to the second projection. The second back wall has an arcuate surface facing the second axis 38. It is understood that the geometrical relation between the arcuate surfaces on the second projection and the second back wall may be the same as the geometrical relation between the arcuate surfaces 44 and 48 of the first projection 42 and first back wall 46.

For housing portion 84, shown in FIG. 7, the arcuate surface 48 of the back wall 46 comprises a first surface portion 108 which has a first radius of curvature 110, and a second surface portion 112, positioned proximate to end 74 of the housing portion. The second surface portion 112 has an infinite radius of curvature, meaning that the second surface portion is a flat facet 114. The facet 114 is arranged such that the distance 80 between the arcuate surface 44 of the projection 42 and the arcuate surface 48 of back wall 46 is smaller over the angle 116 subtended by the first surface portion 108 than over the angle 118 subtended by the second surface portion 112, that being the facet 114. Second surface portion 112 may subtend an angle 118 from about 5° to about 45°. A subtended angle from about 5° to about 30° is also practical.

Figure 8:
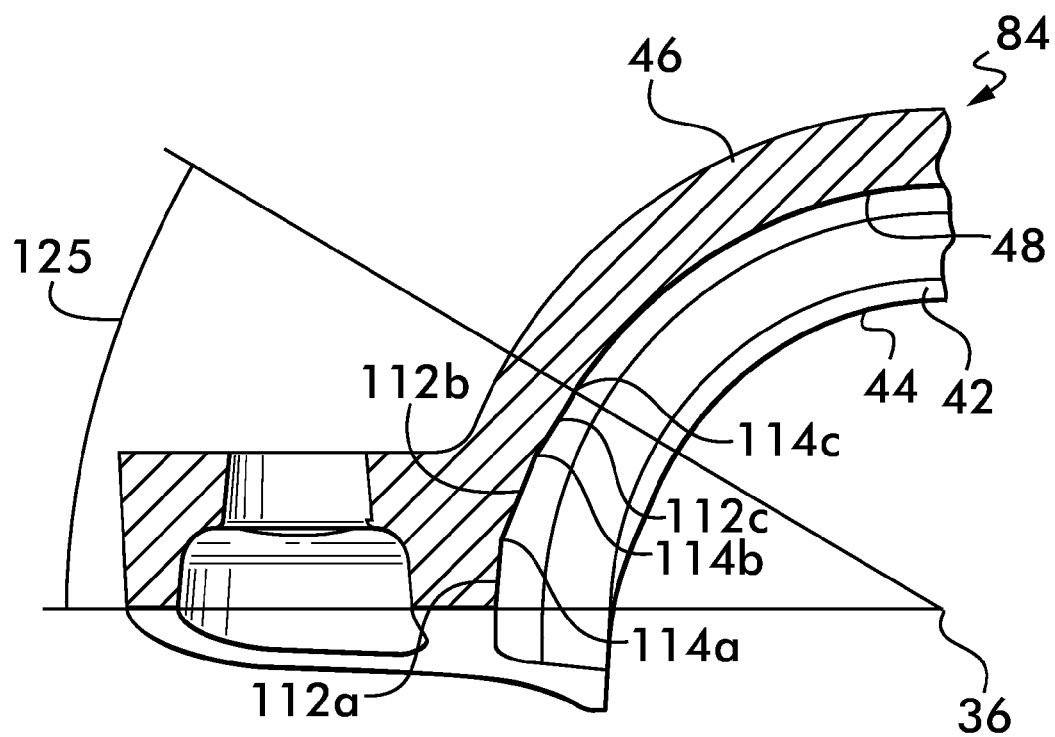
FIG. 8 shows a partial cross sectional view of an example housing portion on an enlarged scale.

In this example the arcuate surface 48 further comprises a third surface portion 120 located at the opposite end 76 of the housing portion. In this example the third surface portion 120 also has an infinite radius of curvature, thereby forming a facet 122. The facet 122 is arranged such that the distance 80 between the arcuate surface 44 of the projection 42 and the arcuate surface 48 of back wall 46 is smaller over the angle 116 subtended by the first surface portion 108 than over the angle 124 subtended by the third surface portion 120. Third surface portion 120 may subtend an angle 124 from about 5° to about 45°. A subtended angle from about 5° to about 30° is also practical. While the second and third surface portions 112 and 120 of the housing portion 84 are each shown as formed of single facets 114 and 122, it is advantageous to form a plurality of facets proximate each end of the housing portion 84. An example of this multifaceted structure is shown on an enlarged scale in FIG. 8, wherein the surface 48 of housing portion 84 is comprised of a plurality of second surface portions 112a, 112b, 112c, each having an infinite radius of curvature and forming respective facets 114a, 114b, 114c. The plurality of surface portions 112a, 112b, 112c may subtend an angle 125 from about 5° to about 80°. A subtended angle from about 5° to about 30° is also practical.

Note that the distances 80 are exaggerated for clarity. While the geometrical relationships between the arcuate surfaces 44 and 48 are described for one projection on one housing portion, it is understood that each housing portion of a fitting may have such a projection surrounding each opening of the fitting and such a back wall positioned adjacent to each respective projection. It is further understood that the geometrical relation between the arcuate surfaces on each projection and the arcuate surface of each back wall may be the same. For example, it is contemplated that each housing portion may further comprise a second projection extending circumferentially about the second opening 22 (see FIGS. 1 and 9-13) of the fitting. In this example, at least a portion of the second projection is engageable with one of the pipe elements (26, as shown in FIGS. 10 and 13), and the second projection has an arcuate surface facing the second axis 38 (see FIG. 10). Each housing portion may further comprise a second back wall positioned adjacent to the second projection. The second back wall has an arcuate surface facing the second axis 38. It is understood that the geometrical relation between the arcuate surfaces on the second projection and the second back wall may be the same as the geometrical relation between the arcuate surfaces 44 and 48 of the first projection 42 and first back wall 46.

The receptacle of varying depth, which allows the degree of distortion of the seal to be controlled, provides several advantages over prior art housing portions having receptacles where the depth is a constant. When the fitting is factory assembled the seal may have a controlled shape between oval and round. Choosing a configuration wherein the seal (55, for example) has less distortion means that when a pipe element is inserted into the opening it will engage the pipe stop 57 (shown in FIG. 5) within the seal more uniformly, thereby promoting proper seating of the pipe elements in the fitting. Furthermore, for a seal with less distortion there is less likelihood of pinching the seal between the ends of the housing portions. However, inducing some reasonable degree of distortion to the shape of the seal allows it to grip and hold onto the pipe element during assembly, which is advantageous for the technician.

The receptacle of varying depth described above and claimed herein is applicable to both rigid and flexible fittings. Rigid fittings are advantageously used with circumferentially grooved pipe elements. The housing portions of rigid fittings have interfacing surfaces which have opposite angular orientations with respect to one another. In exemplary rigid fittings, when the fasteners joining such housing portions together are tightened, the interfacing surfaces on one housing portion contact their counterpart surfaces on the mating housing portion and the housing portions are forced to rotate about a vertical axis in opposite directions relatively to one another. This causes the projections to engage the sidewalls of the circumferential groove in the pipe elements and lock them in place so as to provide significant resistance to external bending forces, inward and outward thrust forces, and torque applied to the connection, thereby limiting the relative deflections of the pipe elements. Examples of rigid fittings are shown herein in FIGS. 11-16. Rigid fittings are disclosed in co-pending U.S. patent application Ser. No. 13/364,412 entitled "Fitting for Joining Pipe Elements" and filed on Feb. 2, 2012, now U.S. Pat. No. 8,820,795, said application being hereby incorporated by reference herein in its entirety. Patents disclosing rigid couplings include U.S. Pat. Nos. 4,611,839 and 4,639,020, said patents being hereby incorporated by reference in their entirety herein.

In a flexible fitting the interfacing surfaces between the housing portions are typically not configured to cause any relative rotation of the housing portions. Thus the projections typically do not engage the sidewalls of the circumferential groove due to twisting action of the housing portions which results in a more flexible connection, where the relative deflections of the pipe elements in bending, torsionally and axially, are greater than for the rigid fitting (described above) for the same applied loads. FIGS. 1 and 9-10 show an example flexible fitting.

The receptacle of varying depth described above and claimed herein is also applicable to adapter fittings, such as, for example and without limitation, reducers, which permit pipe elements of different nominal sizes to be coupled together. In adapter fittings each housing portion has projections of different radii of curvature matched to fit and engage a different size pipe element. Examples of adapter fittings used to couple grooved pipe elements are disclosed in U.S. Pat. Nos. 3,680,894 and 4,896,902, said patents being hereby incorporated by reference herein.

FIG. 9 shows the fitting 10 in the "installation ready" state, i.e., partially assembled with the first and second housing portions 12 and 14 held in spaced apart relation sufficient to permit the pipe elements 24 and 26 to be conveniently inserted into the respective openings 20 and 22 without disassembling the fitting 10. To effect a fluid tight connection, pipe elements 24 and 26 are inserted into opening 20 and 22 where they respectively engage the first and second seals 55 and 58. Fasteners 34 are then tightened, drawing the housing portions 12 and 14 together (as shown in FIG. 10) and compressing the first and second seals between the housing portions and the pipe elements 24 and 26 while also engaging the receptacles 16 and 18 with their respective pipe elements 24 and 26 to mechanically capture and retain the pipe elements together. In this example, positive mechanical engagement between the fitting 10 and the pipe elements 24 and 26 is effected by the projections 42 positioned on each housing portion 12 and 14. Projections 42 may have notches 128 at opposite ends to provide clearance and facilitate pipe element insertion. Upon assembly of the fitting 10, the projections surround the openings 20 and 22 and engage circumferential grooves 130 in the pipe elements 24 and 26 (see FIG. 9). Fittings according to the invention are of course not limited to use with grooved pipe elements, but may also be adapted to plain end pipe elements, flared pipe elements as well as shouldered pipe elements. Housing portions 12 and 14 may be conveniently supported in spaced relation by contact with the first and second seals 55 and 58.

Figure 11:
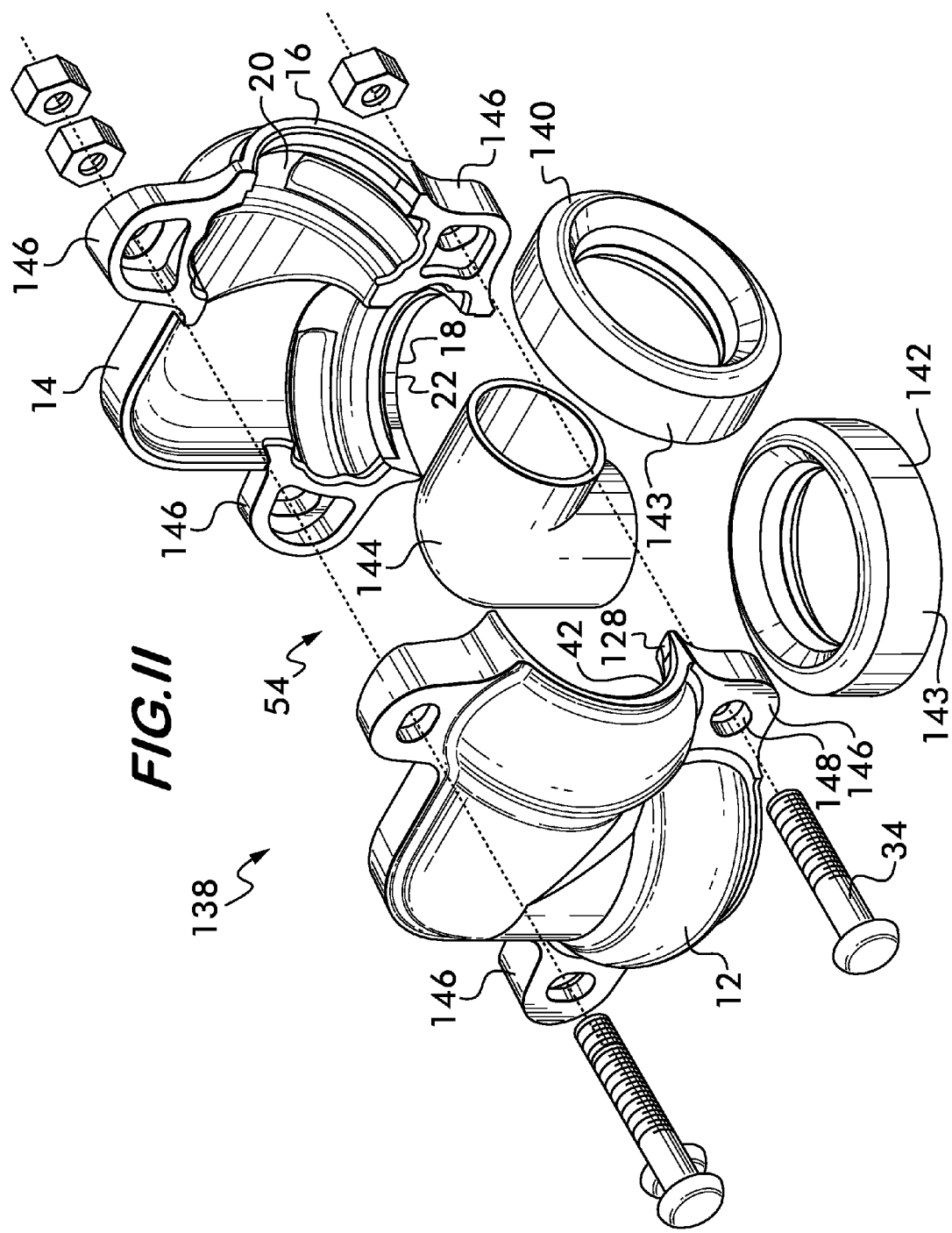
FIG. 11 is an isometric exploded view of an alternate embodiment of an elbow fitting according to the invention.
Figure 12:
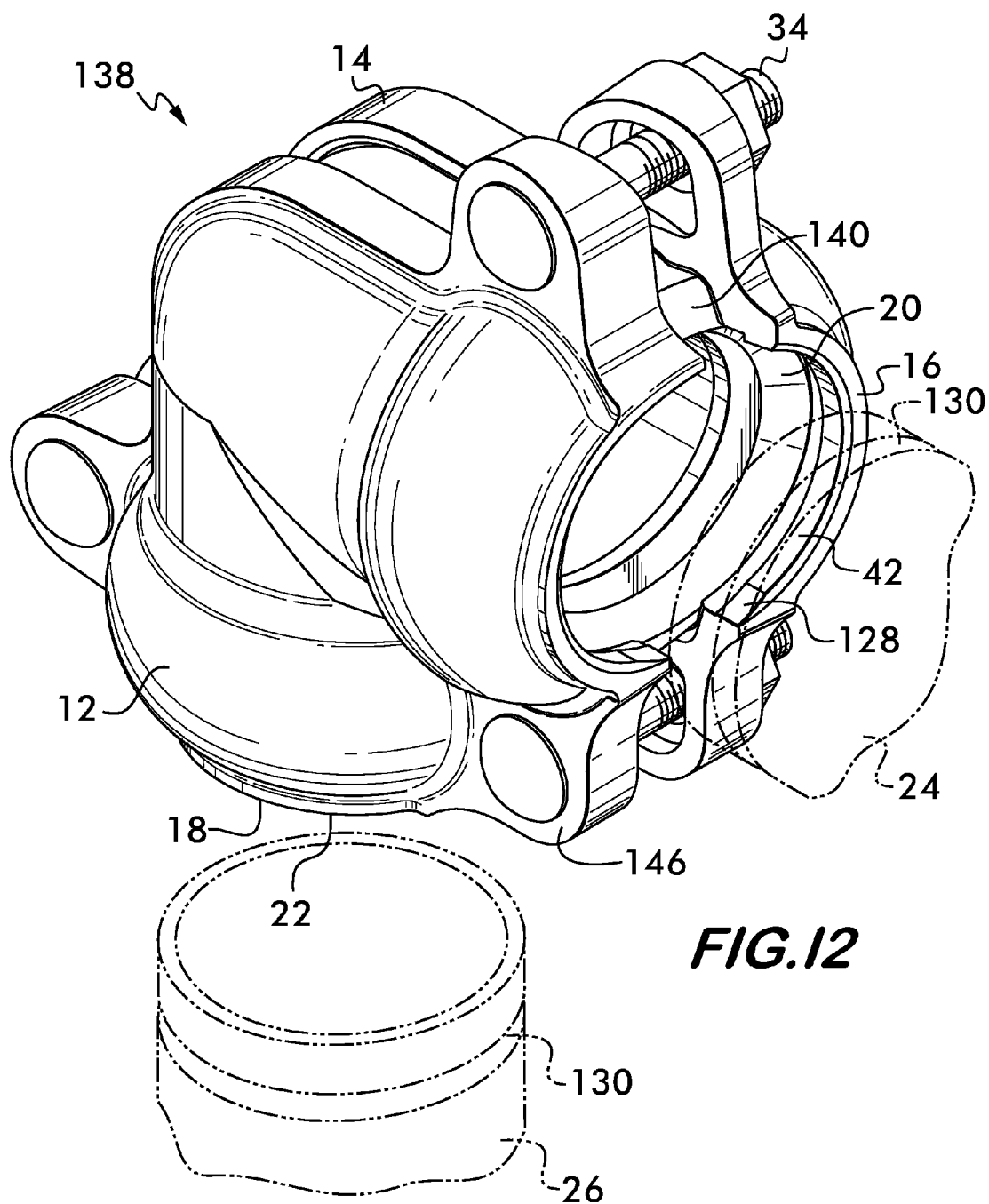
FIG. 12 is an isometric view of the elbow fitting shown in FIG. 11 preassembled in an installation ready configuration.
Figure 13:
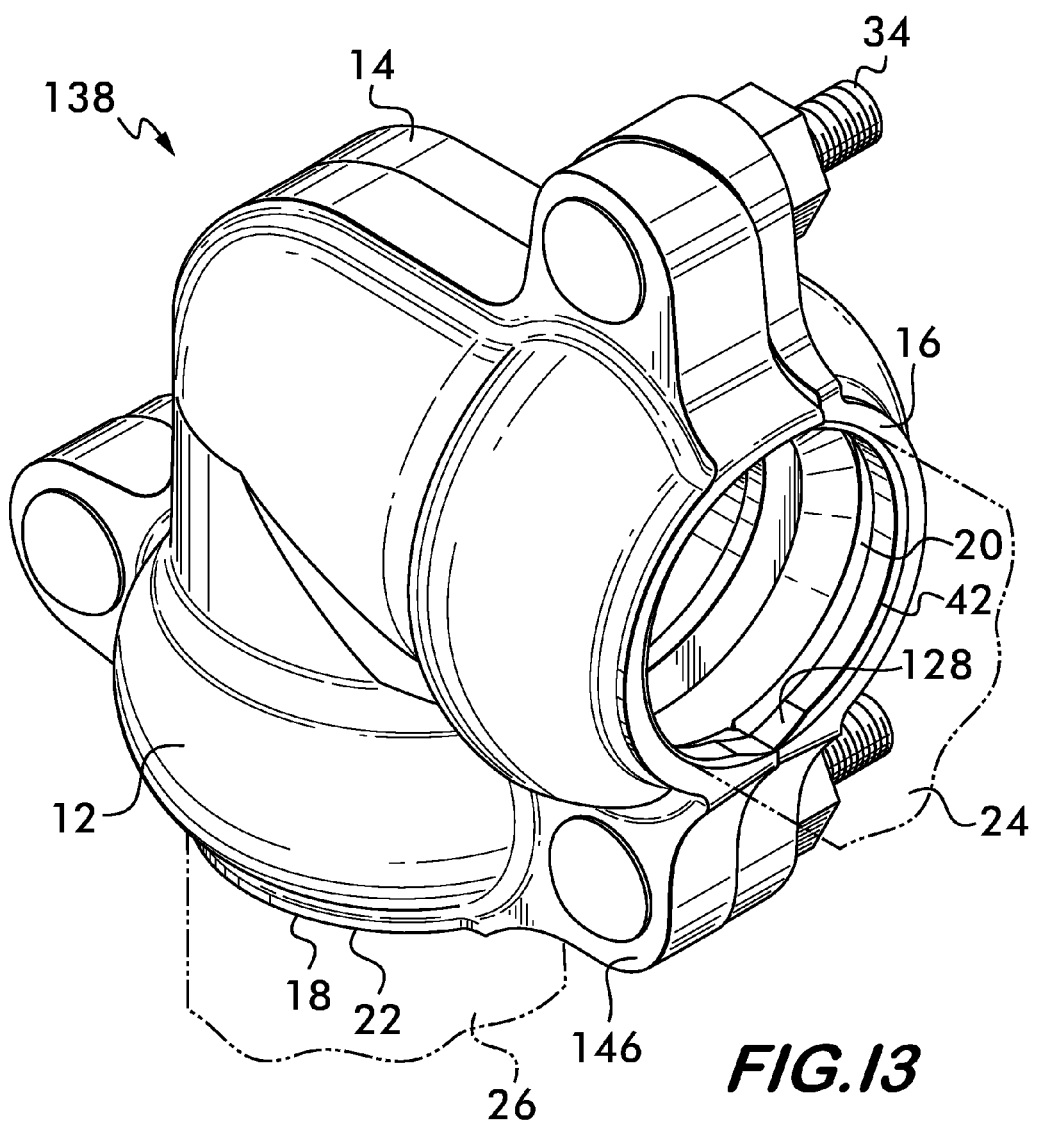
FIG. 13 is an isometric view of the elbow fitting shown in FIG. 11 joining pipe elements together.

FIGS. 11 through 13 illustrate another example embodiment of a fitting 138 according to the invention. It is understood that the features and geometrical relationships described above with respect to fittings 10, 82, and 84 (see FIGS. 4-8) may also be included in fitting 138. For example, similar to fitting 10, fitting 138 is comprised of housing portions 12 and 14 which are attached to one another by adjustable fasteners 34 and define first and second receptacles 16 and 18. The receptacles define openings 20 and 22 for receiving pipe elements 24 and 26 as shown in FIG. 12. Each housing portion 12 and 14 has a first projection 42 that extends circumferentially around the first opening 20. The first projection 42 may have an arcuate surface. The first projections 42 may have one or more notches 128 to facilitate insertion of the pipe elements into the first opening 20. Fitting 138 may include a back wall having an arcuate surface. The geometrical relationships between the arcuate surfaces of the projections and back walls of fitting 138 may be the same as the geometrical relationships described above with respect to the projections and back walls of fittings 10, 82, and 84 (see FIGS. 4-8).

As shown in FIG. 11, the sealing element 54 of fitting 138 is formed of three separate components and comprises first and second seals 140 and 142 and a tube 144. Seals 140 and 142 are respectively positioned within the first and second receptacles 16 and 18 defined by the housing portions and tube 144 extends within the fitting 138 between the seals 140 and 142. In this embodiment the seals 140 and 142 are made of a flexible material, for example, elastomers such as EPDM, as well as nitrile, silicone, neoprene and fluoropolymer elastomers while the tube 144 is formed of a more rigid material, such as PVC, metal, glass, a ceramic material, or one or more engineering polymers, including both thermoplastic and thermoset polymers. Exemplary rigid engineering thermoplastic polymers that can be used to form the tube 144 include polyphenylene and polystyrene. This choice of different materials allows the seals 140 and 142 to sealingly engage the tube 144 when they are compressed between the housing portions 12 and 14. Sealing interaction between the seals 140 and 142, the pipe elements 24 and 26 and the tube 144 permits a fluid tight connection to be formed when fitting 138 is used to join pipe elements 24 and 26 together as shown in FIG. 13.

Similar to fitting 10, fitting 138 has a plurality of lugs 146 which extend from the first and second housing portions. Lugs 146 define holes 148 which align with one another and receive adjustable fasteners 34 for attaching the housing portions to one another when the fitting 138 is assembled as shown in FIGS. 12 and 13.

Like fitting 10, fitting 138 is also installation ready, meaning that it need not be disassembled to form a pipe connection. FIG. 12 shows the fitting 138 in the installation ready configuration with the housing portions 12 and 14 in spaced apart relation. In this example the housing portions are supported in spaced apart relation by contact with the first and second seals 140 and 142. As shown in FIG. 11, each of the first and second seals has an outer circumference 143 sized to support the housing portions 12 and 14 in spaced apart relation sufficient to permit the pipe elements 24 and 26 (see FIG. 12) to be inserted into the openings 20 and 22 without disassembling the fitting. Notches 128 in the ends of projections 42 facilitate pipe element insertion by providing clearance.

Figure 14:
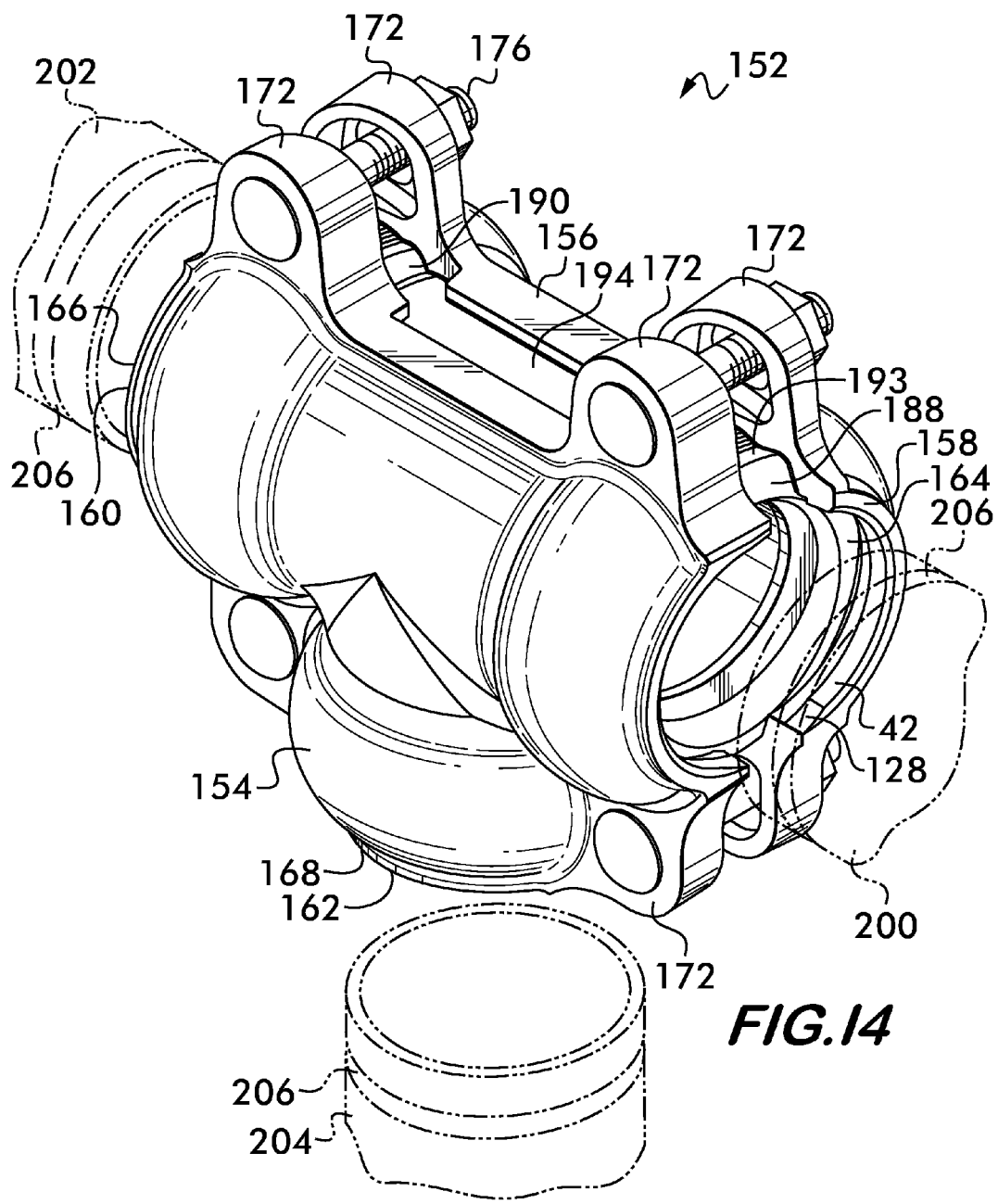
FIG. 14 is an isometric view of an example tee fitting according to the invention and shown pre-assembled in an installation ready configuration.
Figure 15:
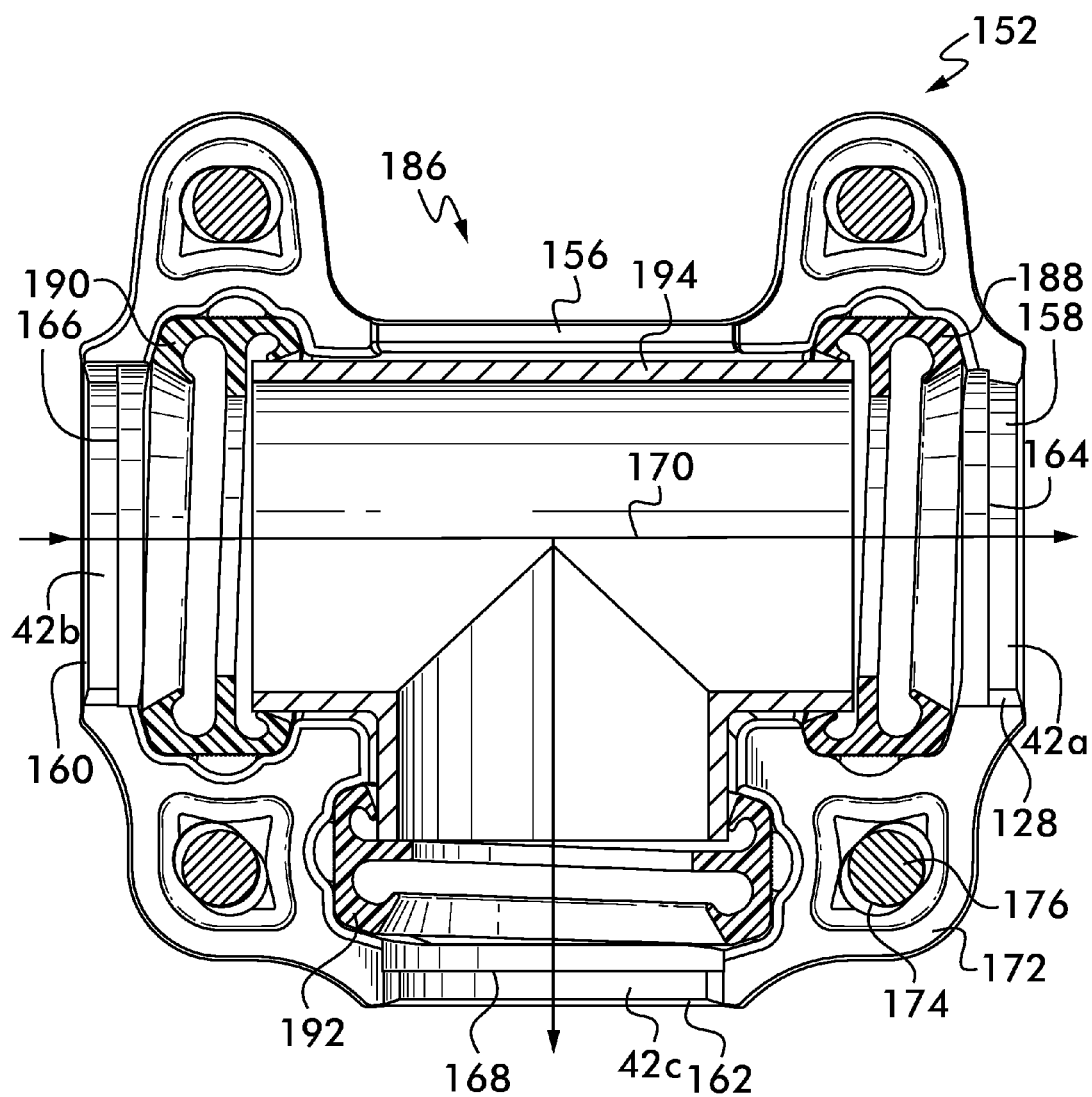
FIG. 15 is a side view of a portion of the tee fitting shown in FIG. 14 showing the internal surfaces of the fitting.

FIGS. 14 through 16 illustrate an example tee fitting 152 according to the invention. As shown in FIG. 14, fitting 152 comprises first and second housing portions 154 and 156. When attached to one another, the housing portions 154 and 156 define a first receptacle 158, a second receptacle 160 and a third receptacle 162. Receptacles 158, 160 and 162 define respective first, second and third openings 164, 166 and 168 for receiving respective pipe elements 200, 202 and 204, shown in phantom line. Housing portions 154 and 156 together also define a fluid path extending between the first, second and third receptacles 158, 160 and 162, the fluid path being depicted by the arrow 170 shown in FIG. 15 for clarity.

Again with reference to FIG. 14, a plurality of lugs 172 extend from each housing portion 154 and 156. In the example tee fitting 152 each housing portion has four lugs. Lugs 172 define holes 174 (see FIG. 15). When the housing portions 154 and 156 are assembled in facing relation as shown in FIG. 14, the holes 174 in lugs 172 align to receive fasteners 176 which attach the housing portions to one another to form the tee fitting 152. Fasteners 176 are adjustably tightenable so as to draw the first and second housing portions 154 and 156 toward one another and bring the first, second and third receptacles 158, 160, and 162 into engagement with the pipe elements 200, 202, and 204 (respectively) so as to affix the pipe elements together as shown in FIG. 16.

In the example tee fitting embodiment 152, as shown in FIG. 16, the first receptacle 158 surrounds a first axis 178 oriented coaxially with the first opening 164. The second receptacle 160 surrounds a second axis 180 oriented coaxially with the second opening 166. The first receptacle 158 is co-linear with the second receptacle 160. The third receptacle 162 surrounds a third axis 182 oriented angularly with respect to the first and second axes 178 and 180. Axes 178, 180 and 182 may be used to describe the angular orientation of the receptacles 158, 160, and 162 relatively to one another. In the example tee fitting 152, the orientation angle 184 between axes 182 and either axis 178 or 180 is about 90°. For practical tee designs the orientation angle 184 may range from about 30° to about 150° as shown in phantom line. It is further understood that the housing portions 154 and 156 make take any practical shape between the receptacles 158, 160 and 162. Thus, for example, particular sections extending between receptacles may be straight segments as shown, or may be curved, so long as the receptacles are oriented with respect to one another as defined by the orientation angles between their respective axes as defined herein and illustrated in FIG. 16.

To establish and maintain fluid tightness of a connection between pipe elements formed by the tee fitting 152, a sealing element 186, shown in FIG. 15, is positioned between the housing portions 154 and 156. Sealing element 186 comprises a first seal 188 positioned within the first receptacle 158, a second seal 190 positioned within the second receptacle 160, and a third seal 192 positioned within the third receptacle 162. A tube 194 extends within the tee fitting 152 along the fluid path described by arrow 170 between the first, second and third seals 188, 190 and 192. In this example, the first second and third seals are separate from the tube 194, but it is understood that the sealing element 186 comprising the three seals and the tube could be formed integrally from one piece similar to the sealing element 54 shown in FIG. 1. When formed from one piece the sealing element 186 may be formed from elastomeric materials such as EPDM, as well as nitrile, silicone, neoprene and fluoropolymer elastomers. When sealing element 186 is formed as separate pieces as shown in FIG. 14 the seals 188, 190 and 192 may be formed of a flexible elastic material, for example an elastomer such as EPDM, as well as nitrile, silicone, neoprene and fluoropolymer elastomers whereas the tube is formed of a relatively more rigid material such as PVC, metal, glass, a ceramic material, or one or more engineering polymers, including both thermoplastic and thermoset polymers. Exemplary rigid engineering thermoplastic polymers that can be used to form the tube 144 include polyphenylene and polystyrene.

FIG. 14 shows the tee fitting 152 in the "installation ready" state, i.e., factory-assembled in an untightened configuration with the first and second housing portions 154 and 156 held in spaced apart relation sufficient to permit the pipe elements 200, 202 and 204 to be conveniently inserted into the respective openings 164, 166 and 168 without disassembling the tee fitting. To effect a fluid tight connection, pipe elements 200, 202 and 204 are inserted into openings 164, 166 and 168 where they respectively engage the first, second and third seals 188, 190 and 192. Fasteners 176 are then tightened, drawing the housing portions 154 and 156 together (as shown in FIG. 16) and compressing the first, second and third seals between the housing portions and the pipe elements 200, 202 and 204 while also engaging the receptacles 158, 160 and 162 with their respective pipe elements 200, 202 and 204 to mechanically capture and retain the pipe elements together. In this example, positive mechanical engagement between the tee fitting 152 and the pipe elements 200, 202 and 204 is effected by the projections 42 positioned on each housing portion 154 and 156. Projections 42 may have notches 128 at opposite ends to provide clearance and facilitate pipe element insertion. As shown in FIG. 15, upon assembly of the tee fitting 152, the projections 42a, 42b, and 42c respectively surround the openings 164, 166 and 168 and engage circumferential grooves 206 in the pipe elements 200, 202 and 204. Tee fittings according to the invention are of course not limited to use with grooved pipe elements, but may also be adapted to plain end pipe elements, flared pipe elements, beaded pipe elements, as well as shouldered pipe elements.

As set forth herein, the projections 42a, 42b, and 42c may have arcuate surfaces that respectively face axes 178, 180, and 182. Housing portions 154 and 156 may further comprise first, second, and third back walls that are respectively positioned adjacent to projections 42a, 42b, and 42c. The first, second, and third back walls may have arcuate surfaces that respectively face axes 178, 180, and 182. The geometrical relationships between the arcuate surfaces of projections 42a, 42b, and 42c and the arcuate surfaces of the first, second, and third back walls may be the same as the geometrical relationships described above with respect to the first projections 42 and first back walls 46 of fittings 10, 82, and 84 (see FIGS. 4-8).

Housing portions 154 and 156 may be conveniently supported in spaced relation by contact with the first, second and third seals 188, 190 and 192. In the example tee fitting 152 shown in FIGS. 14 through 16, the housing portions 154 and 156 are supported in spaced apart relation by contact with the first, second and third seals 188, 190 and 192. As shown in FIG. 14, each of the seals has an outer circumference 193 sized to support the housing portions 154 and 156 in spaced apart relation sufficient to permit the pipe elements 200, 202 and 204 to be inserted into the openings 164, 166 and 168 without disassembling the tee fitting.

The tee fitting 152 may be designed to provide a relatively flexible connection, or a relatively rigid connection.

Elbow and tee fittings according to the invention provide for greatly increased efficiency in the formation of pipe connections as it is not necessary to disassemble and reassemble the fitting to create the connection.

What is claimed is:

1. A fitting for connecting at least two pipe elements together, said fitting comprising:
    first and second housing portions attached to one another and defining at least first and second eccentrically shaped receptacles, said first and second eccentrically shaped receptacles respectively defining first and second openings for receiving said pipe elements, said first and second eccentrically shaped receptacles respectively surrounding first and second axes, said first axis oriented coaxially with said first opening, said second axis oriented coaxially with said second opening, said first axis being angularly oriented with respect to said second axis, said housing portions further defining a fluid path extending between said first and second eccentrically shaped receptacles, each of said housing portions comprising:
    a first arcuate surface extending circumferentially about said first opening, at least a portion of said first arcuate surface being engageable with one of said pipe elements, said first arcuate surface facing said first axis; and
    a first back wall positioned eccentric to said first arcuate surface, as manifest by said first back wall having an arcuate surface facing said first axis, a distance between said arcuate surface of said back wall and said first arcuate surface, as measured along a radially projecting line extending from said first axis, being a first value at a first point midway between ends of said housing portion, and a second value at a second point proximate to at least one of said ends of said housing portion, said first value being less than said second value; and
    at least one adjustable fastener attaching said first and second housing portions to one another, said housing portions being supported in spaced apart relation sufficient to permit said pipe elements to be inserted into said eccentrically shaped receptacles while said housing portions are attached to one another, each said fastener being adjustably tightenable so as to draw said housing portions toward one another and bring said first arcuate surfaces of said housing portions into engagement with said pipe elements so as to affix said pipe elements together, whereby said first arcuate surface is positioned concentric with said first axis, and said arcuate surface of said first back wall is positioned eccentric to said first axis.

2. The fitting according to claim 1, further comprising a first projection extending circumferentially about said first opening, said first arcuate surface being positioned on said first projection.

3. The fitting according to claim 2, wherein each of said housing portions further comprises:
    a second projection extending circumferentially about said second opening, at least a portion of said second projection being engageable with one of said pipe elements, said second projection having a second arcuate surface facing said second axis; and
    a second back wall positioned eccentric to said second arcuate surface, as manifest by said second back wall having an arcuate surface facing said second axis, a distance between said arcuate surface of said second back wall and said arcuate surface, as measured along a radially projecting line extending from said second axis, being a first value at a first point midway between ends of said housing portion, and a second value at a second point proximate to at least one of said ends of said housing portion, said first value being less than said second value, whereby said second arcuate surface is positioned concentric with said second axis, and said arcuate surface of said second back wall is positioned eccentric to said second axis.

4. The fitting according to claim 1, wherein, for each of said housing portions, said distance is a minimum at said first point midway between ends of said housing portion.

5. The fitting according to claim 4, wherein, for each of said housing portions, said distance is a maximum at said second point, said second point being positioned at said at least one end of said housing portion.

6. The fitting according to claim 5, wherein, for each of said housing portions, said distance between said arcuate surface of said back wall and said first arcuate surface at a third point positioned at another of said ends of said housing portion is a third value approximately equal to said second value.

7. The fitting according to claim 1, wherein, for each of said housing portions:
said first arcuate surface has a first radius of curvature measured from a first center of curvature; and
said arcuate surface of said back wall has a second radius of curvature measured from a second center of curvature, said second center of curvature being non-coincident with said first center of curvature as measured in a plane perpendicular to said first axis.

8. The fitting according to claim 7, wherein, for each of said housing portions, said first center of curvature is closer to said arcuate surface of said back wall than said second center of curvature when measured to a point on said arcuate surface of said back wall that is collinear with said first and second centers of curvature.

9. The fitting according to claim 8, wherein, for each of said housing portions, said first and second centers of curvature and said point on said back wall are collinear along a first line oriented perpendicular to a second line extending between a first end of said housing portion and a second end of said housing portion.

10. The fitting according to claim 9, wherein, for each of said housing portions, said second center of curvature is offset from said first center of curvature at a distance from about 0.01 inches to about 0.1 inches.

11. The fitting according to claim 9, wherein, for each of said housing portions, said second center of curvature is offset from said first center of curvature at a distance of about 0.02 inches to about 0.04 inches.

12. The fitting according to claim 9, wherein, for each of said housing portions, said second center of curvature is offset from said first center of curvature at a distance of about 0.03 inches.

13. The fitting according to claim 1, further comprising at least one lug extending from each of said first and second housing portions, each of said lugs defining a hole for receiving one of said fasteners.

14. The fitting according to claim 1, further comprising:
a first seal positioned within said first receptacle and surrounding said first opening;
a second seal positioned within said second receptacle and surrounding said second opening; and
a tube extending within said housing portions between said first and second seals.

15. The fitting according to claim 14, wherein said first and second housing portions are supported in said spaced relation by contact with said first and second seals.

16. A fitting for connecting at least two pipe elements together, said fitting comprising:
first and second housing portions attached to one another and defining at least first and second eccentrically shaped receptacles, said first and second eccentrically shaped receptacles respectively defining first and second openings for receiving said pipe elements, said first and second eccentrically shaped receptacles respectively surrounding first and second axes, said first axis oriented coaxially with said first opening, said second axis oriented coaxially with said second opening, said first axis being angularly oriented with respect to said second axis, said housing portions further defining a fluid path extending between said first and second eccentrically shaped receptacles, each of said housing portions comprising:
a first arcuate surface extending circumferentially about said first opening, at least a portion of said first arcuate surface being engageable with one of said pipe elements, said first arcuate surface facing said first axis, said first arcuate surface having a first radius of curvature measured from a first center of curvature; and
a first back wall positioned eccentric to said first arcuate surface, as manifest by said first back wall having an arcuate surface facing said first axis, said arcuate surface of said back wall having a second radius of curvature measured from a second center of curvature, said second center of curvature being non-coincident with said first center of curvature as measured in a plane perpendicular to said first axis; and
at least one adjustable fastener attaching said first and second housing portions to one another, said housing portions being supported in spaced apart relation sufficient to permit said pipe elements to be inserted into said eccentrically shaped receptacles while said housing portions are attached to one another, each said fastener being adjustably tightenable so as to draw said housing portions toward one another and bring said first arcuate surfaces of said housing portions into engagement with said pipe elements so as to affix said pipe elements together, whereby said first arcuate surface is positioned concentric with said first axis, and said arcuate surface of said first back wall is positioned eccentric to said first axis.

17. The fitting according to claim 16, further comprising a first projection extending circumferentially about said first opening, said first arcuate surface being positioned on said first projection.

18. The fitting according to claim 16, wherein, for each of said housing portions, said first center of curvature is closer to said arcuate surface of said back wall than said second center of curvature when measured to a point on said arcuate surface of said back wall that is collinear with said first and second centers of curvature.

19. The fitting according to claim 18, wherein, for each of said housing portions, said first and second centers of curvature and said point on said back wall are collinear along a first line oriented perpendicular to a second line extending between a first end of said housing portion and a second end of said housing portion.

20. The fitting according to claim 19, wherein, for each of said housing portions, said second center of curvature is offset from said first center of curvature at a distance from about 0.01 inches to about 0.1 inches.

21. The fitting according to claim 19, wherein, for each of said housing portions, said second center of curvature is offset from said first center of curvature at a distance of about 0.02 inches to about 0.04 inches.

22. The fitting according to claim 18, wherein, for each of said housing portions, said second center of curvature is offset from said first center of curvature at a distance of about 0.03 inches.

23. The fitting according to claim 17, wherein each of said housing portions further comprises:
   a second projection extending circumferentially about said second opening, at least a portion of said second projection being engageable with one of said pipe elements, said second projection having a second arcuate surface facing said second axis, said arcuate surface having a first radius of curvature measured from a first center of curvature; and
   a second back wall positioned eccentric to said second arcuate surface, as manifest by said second back wall having an arcuate surface facing said second axis, said arcuate surface of said second back wall having a second radius of curvature measured from a second center of curvature, said second center of curvature being non-coincident with said first center of curvature as measured in a plane perpendicular to said second axis.

24. The fitting according to claim 16, further comprising at least one lug extending from each of said first and second housing portions, each of said lugs defining a hole for receiving one of said fasteners.

25. The fitting according to claim 16, further comprising:
   a first seal positioned within said first receptacle and surrounding said first opening;
   a second seal positioned within said second receptacle and surrounding said second opening; and
   a tube extending within said housing portions between said first and second seals.

26. The fitting according to claim 25, wherein said first and second housing portions are supported in said spaced relation by contact with said first and second seals.

27. A fitting for connecting at least two pipe elements together, said fitting comprising:
   first and second housing portions attached to one another and defining at least first and second eccentrically shaped receptacles, said first and second eccentrically shaped receptacles respectively defining first and second openings for receiving said pipe elements, said first and second eccentrically shaped receptacles respectively surrounding first and second axes, said first axis oriented coaxially with said first opening, said second axis oriented coaxially with said second opening, said first axis being angularly oriented with respect to said second axis, said housing portions further defining a fluid path extending between said first and second eccentrically shaped receptacles, each of said housing portions comprising:
   a first arcuate surface extending circumferentially about said first opening, at least a portion of said first arcuate surface being engageable with one of said pipe elements, said first arcuate surface facing said first axis; and
   a first back wall positioned eccentric to said first arcuate surface, as manifest by said first back wall having an arcuate surface facing said first axis, a distance between said arcuate surface of said back wall and said first arcuate surface, as measured along a radially projecting line extending from said first axis, being a first value at a first point midway between ends of said housing portion, and a second value at a second point proximate to a first end of said housing portion, and a third value at a third point proximate to an opposite end of said housing portion, said first value being less than said second value and said third value; and
   at least one adjustable fastener attaching said first and second housing portions to one another, said housing portions being supported in spaced apart relation sufficient to permit said pipe elements to be inserted into said eccentrically shaped receptacles while said housing portions are attached to one another, each said fastener being adjustably tightenable so as to draw said housing portions toward one another and bring said first arcuate surfaces of said housing portions into engagement with said pipe elements so as to affix said pipe elements together, whereby said first arcuate surface is positioned concentric with said first axis, and said arcuate surface of said first back wall is positioned eccentric to said first axis.

28. The fitting according to claim 27, further comprising a first projection extending circumferentially about said first opening, said first arcuate surface being positioned on said first projection.

29. The fitting according to claim 28, wherein each of said housing portions further comprises:
   a second projection extending circumferentially about said second opening, at least a portion of said second projection being engageable with one of said pipe elements, said second projection having a second arcuate surface facing said second axis; and
   a second back wall positioned eccentric to said second arcuate surface, as manifest by said second back wall having an arcuate surface facing said second axis, a distance between said arcuate surface of said second back wall and said second arcuate surface, as measured along a radially projecting line extending from said second axis, being a first value at a first point midway between ends of said housing portion, and a second value at a second point proximate to at least one of said ends of said housing portion, said first value being less than said second value, whereby said second arcuate surface is positioned concentric with said second axis, and said arcuate surface of said second back wall is positioned eccentric to said second axis.

30. The fitting according to claim 27, wherein, for each of said housing portions, said distance is a minimum at said first point midway between said ends of said housing portion.

31. The fitting according to claim 30, wherein, for each of said housing portions, said distance is a maximum at said second point, said second point being positioned at a first end of said housing portion.

32. The fitting according to claim 31, wherein, for each of said housing portions, said distance between said arcuate surface of said back wall and said first arcuate surface at said third point positioned at a second end of said housing portion is approximately equal to said distance at said second point.

33. The fitting according to claim 27, further comprising at least one lug extending from each of said first and second housing portions, each of said lugs defining a hole for receiving one of said fasteners.

34. The fitting according to claim 27, further comprising:
   a first seal positioned within said first receptacle and surrounding said first opening;
   a second seal positioned within said second receptacle and surrounding said second opening; and
   a tube extending within said housing portions between said first and second seals.

35. The fitting according to claim 34, wherein said first and second housing portions are supported in said spaced relation by contact with said first and second seals.

* * * * *